(12) United States Patent
Ishii

(10) Patent No.: US 9,479,688 B2
(45) Date of Patent: Oct. 25, 2016

(54) IMAGE CAPTURE APPARATUS

(71) Applicant: CANON KABUSHIKI KAISHA, Tokyo (JP)

(72) Inventor: Hirokazu Ishii, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/713,857

(22) Filed: Dec. 13, 2012

(65) Prior Publication Data

US 2013/0155271 A1 Jun. 20, 2013

(30) Foreign Application Priority Data

Dec. 19, 2011 (JP) .................................. 2011-277659
Nov. 30, 2012 (JP) .................................. 2012-263677

(51) Int. Cl.
| H04N 5/232 | (2006.01) |
| H04N 5/367 | (2011.01) |
| H04N 5/369 | (2011.01) |
| H04N 9/04 | (2006.01) |

(52) U.S. Cl.
CPC .......... *H04N 5/23212* (2013.01); *H04N 5/367* (2013.01); *H04N 5/3696* (2013.01); *H04N 9/045* (2013.01)

(58) Field of Classification Search
USPC ............................... 348/222.1, 246; 382/274
See application file for complete search history.

(56) References Cited

U.S. PATENT DOCUMENTS

| 2002/0005904 A1* | 1/2002 | Mendis .......................... 348/246 |
| 2003/0117489 A1* | 6/2003 | Jones et al. ...................... 348/51 |
| 2003/0146994 A1* | 8/2003 | Kokubun ....................... 348/308 |
| 2009/0167907 A1* | 7/2009 | Utsugi ........................... 348/246 |
| 2011/0080505 A1* | 4/2011 | Ogino ........................... 348/246 |
| 2011/0085785 A1* | 4/2011 | Ishii .............................. 396/104 |

FOREIGN PATENT DOCUMENTS

| JP | 2000-292686 | 10/2000 |
| JP | 2004-241600 A | 8/2004 |
| JP | 2007-199907 A | 8/2007 |
| JP | 2009-124573 | 6/2009 |
| JP | 2009-253936 A | 10/2009 |

OTHER PUBLICATIONS

The above patent documents were cited in the Aug. 29, 2016 Japanese Office Action, which is enclosed without an English Translation, that issued in Japanese Patent Application No. 2012-263677.

* cited by examiner

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

The present invention relates to an image capture apparatus comprising an image sensor that includes a plurality of first pixel portions and a plurality of second pixel portions whose output signals can be used to perform a correlation operation. In a case of a first photographing condition, the apparatus performs correction processing on output signals from the first pixel portions using output signals from the second pixel portions, and in a case of a second photographing condition, does not perform correction processing on output signals from the first pixel portions using output signals from the second pixel portions. The apparatus also performs image processing on a signal resulting from the correction processing or a signal that was not subjected to the correction processing, and records a signal resulting from the image processing.

16 Claims, 17 Drawing Sheets

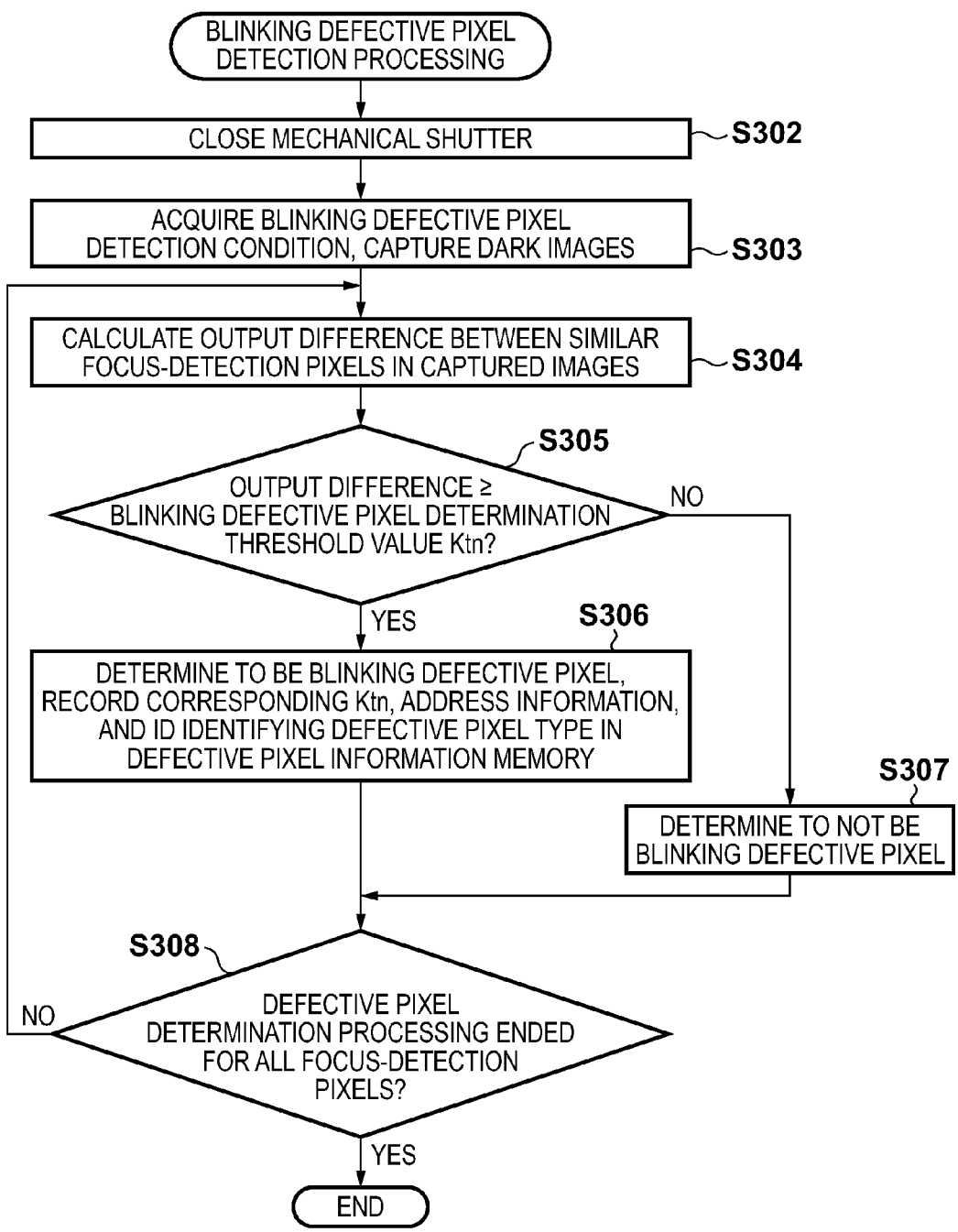

FIG. 4A

BLINKING DEFECTIVE PIXEL DETECTION DETERMINATION THRESHOLD VALUE

| Ktn | DEFECT LEVEL | ABNORMAL OUTPUT SIGNAL LEVEL (mV) |
|---|---|---|
| Kt1 | 000 | 80 mV OR HIGHER IN DEFECTIVE PIXEL DETECTION |
| Kt2 | 001 | 65 mV OR HIGHER IN DEFECTIVE PIXEL DETECTION |
| Kt3 | 010 | 50 mV OR HIGHER IN DEFECTIVE PIXEL DETECTION |
| Kt4 | 011 | 35 mV OR HIGHER IN DEFECTIVE PIXEL DETECTION |
| Kt5 | 100 | 25 mV OR HIGHER IN DEFECTIVE PIXEL DETECTION |
| Kt6 | 101 | 15 mV OR HIGHER IN DEFECTIVE PIXEL DETECTION |
| Kt7 | 110 | 7 mV OR HIGHER IN DEFECTIVE PIXEL DETECTION |
| Kt8 | 111 | 5 mV OR HIGHER IN DEFECTIVE PIXEL DETECTION |

FIG. 4B

STABLE DEFECTIVE PIXEL DETECTION DETERMINATION THRESHOLD VALUE

| Kun | DEFECT LEVEL | ABNORMAL OUTPUT SIGNAL LEVEL (mV) |
|---|---|---|
| Ku1 | 000 | 120 mV OR HIGHER IN DEFECTIVE PIXEL DETECTION |
| Ku2 | 001 | 90 mV OR HIGHER IN DEFECTIVE PIXEL DETECTION |
| Ku3 | 010 | 70 mV OR HIGHER IN DEFECTIVE PIXEL DETECTION |
| Ku4 | 011 | 50 mV OR HIGHER IN DEFECTIVE PIXEL DETECTION |
| Ku5 | 100 | 35 mV OR HIGHER IN DEFECTIVE PIXEL DETECTION |
| Ku6 | 101 | 20 mV OR HIGHER IN DEFECTIVE PIXEL DETECTION |
| Ku7 | 110 | 10 mV OR HIGHER IN DEFECTIVE PIXEL DETECTION |
| Ku8 | 111 | 5 mV OR HIGHER IN DEFECTIVE PIXEL DETECTION |

FIG. 6B
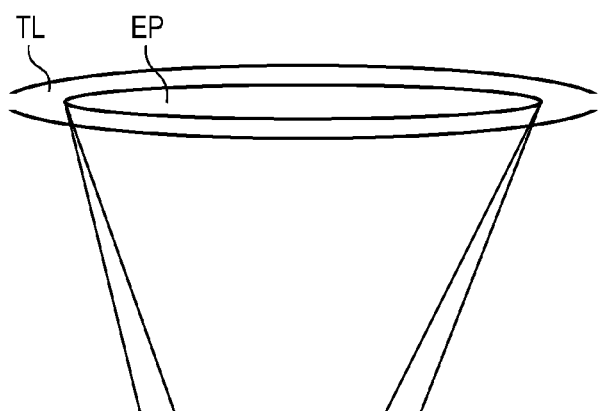
FIG. 6A
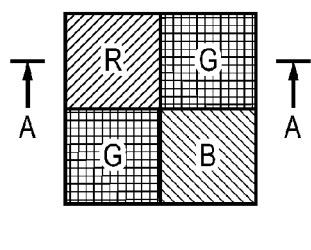
PLAN VIEW
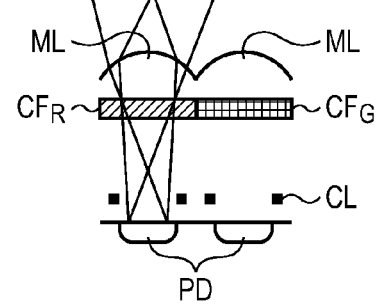
CROSS-SECTIONAL VIEW ALONG A-A

PLAN VIEW CROSS-SECTIONAL VIEW ALONG A-A

FIG. 10A
EXAMPLE OF DEFECTIVE PIXEL DETERMINATION TABLE FOR STABLE DEFECTIVE PIXELS (ISO100)

| TEMPERATURE \ CHARGE ACCUMULATION TIME | ~1/30s | ~1s | ~15s |
|---|---|---|---|
| ~20°C | Ku1 | Ku1-Ku2 | Ku1-Ku4 |
| 20°C~30°C | Ku1-Ku2 | Ku1-Ku3 | Ku1-Ku5 |
| 30°C~40°C | Ku1-Ku3 | Ku1-Ku4 | Ku1-Ku6 |
| 40°C~50°C | Ku1-Ku4 | Ku1-Ku5 | Ku1-Ku7 |
| 50°C~ | Ku1-Ku5 | Ku1-Ku6 | Ku1-Ku8 |

FIG. 10B
EXAMPLE OF DEFECTIVE PIXEL DETERMINATION TABLE FOR STABLE DEFECTIVE PIXELS (ISO1600)

| TEMPERATURE \ CHARGE ACCUMULATION TIME | ~1/30s | ~1s | ~15s |
|---|---|---|---|
| ~20°C | Ku1-Ku4 | Ku1-Ku5 | Ku1-Ku7 |
| 20°C~30°C | Ku1-Ku5 | Ku1-Ku6 | Ku1-Ku8 |
| 30°C~40°C | Ku1-Ku6 | Ku1-Ku7 | Ku1-Ku8 |
| 40°C~50°C | Ku1-Ku7 | Ku1-Ku8 | Ku1-Ku8 |
| 50°C~ | Ku1-Ku8 | Ku1-Ku8 | Ku1-Ku8 |

FIG. 10C
EXAMPLE OF DEFECTIVE PIXEL DETERMINATION TABLE FOR BLINKING DEFECTIVE PIXELS (ISO100)

| TEMPERATURE \ CHARGE ACCUMULATION TIME | ~1/30s | ~1s | ~15s |
|---|---|---|---|
| ~20°C | Kt1-Kt4 | Kt1-Kt4 | Kt1-Kt4 |
| 20°C~30°C | Kt1-Kt4 | Kt1-Kt4 | Kt1-Kt4 |
| 30°C~40°C | Kt1-Kt4 | Kt1-Kt4 | Kt1-Kt4 |
| 40°C~50°C | Kt1-Kt4 | Kt1-Kt4 | Kt1-Kt4 |
| 50°C~ | Kt1-Kt4 | Kt1-Kt4 | Kt1-Kt4 |

FIG. 10D
EXAMPLE OF DEFECTIVE PIXEL DETERMINATION TABLE FOR BLINKING DEFECTIVE PIXELS (ISO1600)

| TEMPERATURE \ CHARGE ACCUMULATION TIME | ~1/30s | ~1s | ~15s |
|---|---|---|---|
| ~20°C | Kt1-Kt8 | Kt1-Kt8 | Kt1-Kt8 |
| 20°C~30°C | Kt1-Kt8 | Kt1-Kt8 | Kt1-Kt8 |
| 30°C~40°C | Kt1-Kt8 | Kt1-Kt8 | Kt1-Kt8 |
| 40°C~50°C | Kt1-Kt8 | Kt1-Kt8 | Kt1-Kt8 |
| 50°C~ | Kt1-Kt8 | Kt1-Kt8 | Kt1-Kt8 |

FIG. 14

| G | B | G | B | G |
|---|---|---|---|---|
| $S_{RL}$ | G | $S_{HA}$ | G | $S_{RR}$ |
| G | B | G | B | G |

IMAGE CAPTURE APPARATUS

BACKGROUND OF THE INVENTION

1. Field of the Invention

The present invention relates to an image capture apparatus, and in particular to an image capture apparatus for correcting an image obtained by an image sensor that has focus-detection pixels.

2. Description of the Related Art

There is known to be technology for realizing automatic focus detection by phase difference detection (phase difference AF) without using a separate phase difference detection sensor, by using a portion of the pixels configuring an image sensor as focus-detection pixels, and using the phase difference between subject images obtained from the focus-detection pixels.

For example, in Japanese Patent Laid-Open No. 2000-292686, each focus-detection pixel is given a pupil division function by being provided with a pair of photodiodes A and B at positions that are eccentric to the optical axis of the on-chip microlens. The focus-detection pixels are arranged at predetermined intervals among the imaging pixels, and image signals from the photodiodes A and B are used in phase difference AF.

Since the photodiodes of the focus-detection pixels in Japanese Patent Laid-Open No. 2000-292686 are provided at positions that are eccentric to the optical axis of the on-chip microlens, the focus-detection pixels have a different structure from the imaging pixels, whose photodiodes are provided on the optical axis. The amount of crosstalk on surrounding pixels is therefore different between the imaging pixels and the focus-detection pixels.

Japanese Patent Laid-Open No. 2009-124573 discloses technology for suppressing image quality degradation in the vicinity of the focus-detection pixels that occurs due to crosstalk from the focus-detection pixels on surrounding imaging pixels. Japanese Patent Laid-Open No. 2009-124573 proposes a method for using approximation data on the positions of surrounding focus-detection pixels to correct the influence of crosstalk from focus-detection pixels in image data from the imaging pixels.

With the above-described image capture apparatus of Japanese Patent Laid-Open No. 2009-124573, output from surrounding focus-detection pixels is used to correct the image data output from the imaging pixels. However, if a surrounding focus-detection pixel is a defective pixel, and correction is performed using its output, correction errors will appear in the imaging pixel data. Depending on the extent of the defect, it is possible for the correction to instead make the image quality worse.

SUMMARY OF THE INVENTION

Accordingly, the present invention provides an image capture apparatus that reduces the negative influence that a defective pixel among focus-detection pixels has on the correction results when the output of the focus-detection pixels is used to perform correction processing on the output of imaging pixels that are adjacent or neighboring to the focus-detection pixels.

According to an aspect of the present invention, there is provided an image capture apparatus comprising: an image sensor that includes a plurality of first pixel portions and a plurality of second pixel portions whose output signals can be used to perform a correlation operation; a memory storing information that corresponds to a defective pixel portion among the second pixel portions; a first signal processing unit that, in a case of a first photographing condition, performs correction processing on output signals from the first pixel portions using output signals from the second pixel portions, and in a case of a second photographing condition, does not perform correction processing on output signals from the first pixel portions using output signals from the second pixel portions; and a second signal processing unit that performs image processing on a signal resulting from the correction processing performed by the first signal processing unit or a signal that was not subjected to the correction processing by the first signal processing unit, and records a signal resulting from the image processing.

Further features of the present invention will become apparent from the following description of exemplary embodiments with reference to the attached drawings.

BRIEF DESCRIPTION OF THE DRAWINGS

FIGS. 3A and 3B are flowcharts showing examples of defective pixel detection processing according to the embodiment of the present invention.

FIGS. 4A and 4B are diagrams showing defective pixel determination threshold values according to the embodiment of the present invention.

FIGS. 6A and 6B are a plan view and a cross-sectional view showing an example of a structure of imaging pixels of the image sensor according to the embodiment of the present invention.

FIGS. 10A to 10D are diagrams showing examples of defective pixel determination tables that correspond to various photographing conditions according to the embodiment of the present invention.

FIG. 14 is a diagram showing an arrangement of pixels in the case where the center pixel is a focus-detection pixel according to a variation of the embodiment of the present invention.

DESCRIPTION OF THE EMBODIMENTS

Exemplary embodiments of the present invention will now be described in detail in accordance with the accompanying drawings.

Figure 1:
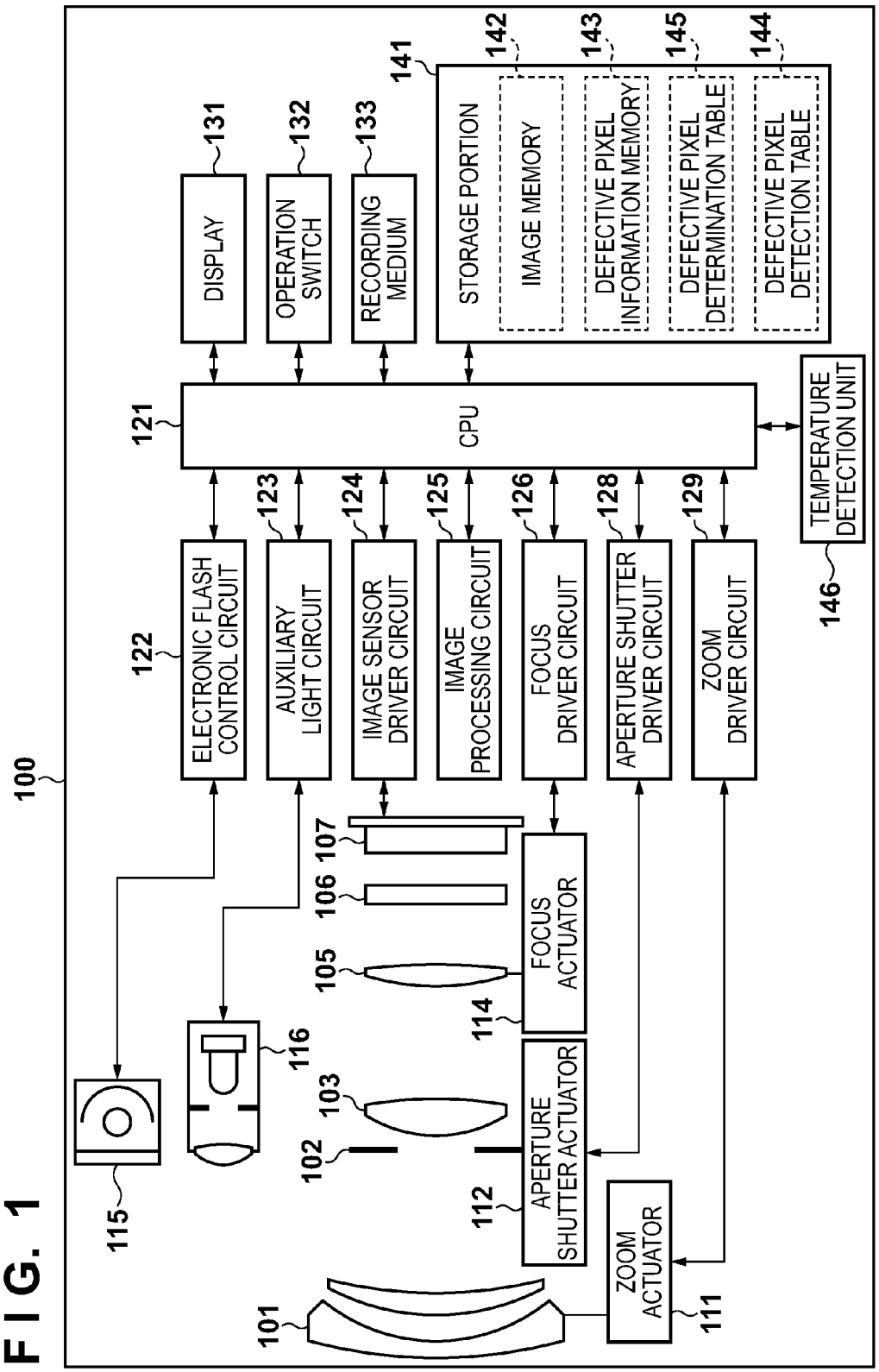
FIG. 1 is a diagram showing an example of a functional configuration of a digital still camera as an example of an image capture apparatus that includes an image processing apparatus according to an embodiment of the present invention.

FIG. 1 is a diagram showing an example of the functional configuration of a digital still camera 100 (simply referred to hereinafter as "camera 100") as an example of an image capture apparatus that includes an image processing apparatus of this embodiment of the present invention or can apply an image processing method of this embodiment of the present invention.

A first lens group 101 is arranged at the leading end of an imaging optical system, and is held so as to be capable of moving forward and backward along the optical axis. A shutter 102 functions not only as a shutter for controlling the light exposure time in still image capturing, but also as an aperture for adjusting the amount of light in image capturing by performing opening diameter adjustment. A second lens group 103 arranged behind (on the image sensor side) of the shutter 102 can move forward and backward along the optical axis together with the shutter 102, and realizes a zoom function along with the first lens group 101.

A third lens group 105 is a focusing lens that can move forward and backward along the optical axis. The focal position of the imaging optical system is adjusted by the position of the third lens group 105. An optical low-pass filter 106 is arranged in front of an image sensor 107 and reduces false coloring and moiré that appear in captured images. The image sensor 107 is configured by a two-dimensional CMOS image sensor and peripheral circuitry. In the present embodiment, the image sensor 107 is a two-dimensional single-plate color image sensor in which light receiving elements are arranged two-dimensionally with m elements horizontally and n elements vertically, on which a primary-color color mosaic filter with the Bayer pattern is formed on-chip. The wavelength of transmitted light that enters the light receiving elements is limited by the color filter in units of pixels.

A zoom actuator 111 realizes a zoom (magnification change) function by driving at least one of the first lens group 101 and the third lens group 105 along the optical axis by rotating a cam barrel (not shown) under control of a zoom driver circuit 129. A shutter actuator 112 adjusts the amount of captured light by controlling the opening diameter of the shutter 102, as well as controls the light exposure time in still image capturing, under control of a shutter driver circuit 128.

A focus actuator 114 drives the third lens group 105 along the optical axis under control of a focus driver circuit 126.

A flash 115 can be a flash illumination apparatus that uses a xenon tube, but may be an illumination apparatus that includes a continuously-emitted LED. An AF auxiliary light output portion 116 projects a mask image having a predetermined pattern of openings into the subject field via a projection lens so as to improve focus detection capability with respect to low-luminance subjects and low-contrast subjects.

A CPU 121 performs overall control of operations of the camera 100, and has an arithmetic portion, a ROM, a RAM, an A/D converter, a D/A converter, a communication interface circuit, and the like (not shown). The CPU 121 realizes functions of the camera 100 such as AF, AE, image processing, and recording by executing programs stored in a non-volatile recording medium (not shown) such as a ROM, and controlling various types of circuits that the camera 100 has.

A flash control circuit 122 performs control for lighting the flash 115 in synchronization with an image capturing operation. An auxiliary light drive control circuit 123 performs control for lighting the AF auxiliary light output portion 116 in a focus detection operation. An image sensor driver circuit 124 controls operations of the image sensor 107, as well as subjects an image signal that was read out from the image sensor 107 to A/D conversion and outputs the converted image signal to the CPU 121. An image processing circuit 125 applies image processing such as y conversion, color interpolation, and JPEG encoding on an image signal.

The focus driver circuit 126 performs focus adjustment by driving the focus actuator 114 based on a focus detection result so as to move the third lens group 105 along the optical axis. The shutter driver circuit 128 controls the opening diameter and open/close timing of the shutter 102 by driving the shutter actuator 112. The zoom driver circuit 129 drives the zoom actuator 111 in accordance with a zoom operation that was input from a photographer by, for example, pressing a zoom operation switch that is including in an operation switch group 132.

A display 131 is an LCD or the like for displaying information regarding the shooting mode of the camera 100, a preview image before image capturing, an image for checking after image capturing, information regarding the focus state in focus detection, and the like. The operation switch group 132 includes a power switch, a release (shooting trigger) switch, a zoom operation switch, a shooting mode selection switch, and the like. A recording medium 133 is a removable semiconductor memory card, for example, and records captured images.

A storage portion 141 has an image memory 142, a defective pixel information memory 143, a defective pixel detection condition table 144, and defective pixel determination tables 145. Details of operations of the storage portion 141 will be described later.

The CPU 121 identifies defective pixels and their types among the focus-detection pixels provided in the image sensor 107, and determines the abnormal output signal levels of the defective pixels (defective output levels).

Several hundred thousand to several tens of millions of pixels are arrayed in the image sensor 107, and included among them are pixels that do not generate signals that they, as pixels, should output (referred to hereinafter as normal output signals), due to influences such as dust and crystal defects in the element-forming material. These pixels are referred to as "defective pixels", and the non-normal signals that these defective pixels output are referred to as "abnormal output signals" (including the state in which no signal whatsoever is output) in the present specification.

Defective pixels are roughly divided into stable defective pixels that stably output abnormal output signals, and blinking defective pixels that non-stably output normal output signals and abnormal output signals. Stable defective pixels and blinking defective pixels are known to have different abnormal signal output characteristics. Excluding defective pixels whose sensitivity is dependent on dust, opening irregularity, and the like, many stable defective pixels are caused by white spot defects due to crystal defects in the light receiving portion. White spot defect pixels are therefore defined as being stable defective pixels in the present specification. Since white spot defect pixels are accompanied by an increase in dark signals, the characteristics of the abnormal signal output level are dependent on the defective pixel temperature and the defective pixel charge accumulation time.

On the other hand, with the blinking defective pixel, the places where crystal defects occur are different from the stable defective pixels, and therefore the characteristics of the abnormal output signal level have almost no dependency on the defective pixel temperature and charge accumulation time.

Figure 2:
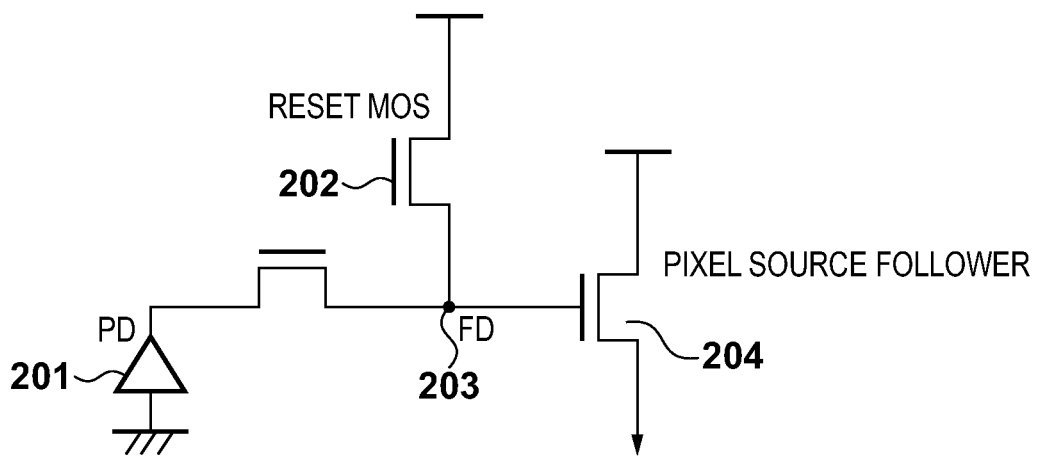
FIG. 2 is a diagram showing an example of a configuration of a pixel of an image sensor according to the embodiment of the present invention.

FIG. 2 shows an example of the circuit configuration of a pixel included in the image sensor 107. The pixel has a photoelectric conversion portion (PD) 201, a reset MOS 202 that resets the accumulated charge, a floating diffusion (FD) 203 that performs charge detection, and a pixel source follower 204. Whereas many stable defective pixels appear due to crystal defects in the PD 201, blinking defective pixels are thought to appear due to electrons being repeatedly trapped and released in the interface state of the MOS transistor that configures the pixel source follower 204. The abnormal output signal level of a blinking defective pixel has almost no dependency on temperature and charge accumulation time since the pixel source follower 204 is the cause of the abnormality.

In the present embodiment, it is determined whether a detected defective pixel is a blinking defective pixel or a stable defective pixel. Note that a configuration that can determine another type of defective pixel is possible.

In FIG. 1, a temperature detection portion 146 detects the temperature of the image sensor 107 or the temperature in the vicinity of the image sensor 107 (ambient temperature). The temperature detection portion 146 is a thermistor, for example.

Defective Pixel Detection Processing

Next, an example of defective pixel detection processing performed by the camera of the present embodiment will be described with reference to the flowcharts of FIGS. 3A and 3B.

The defective pixel detection processing of the present embodiment includes blinking defective pixel detection processing and stable defective pixel detection processing. As described above, the dependency of the abnormal output signal level output characteristics on temperature and charge accumulation time is different between blinking defective pixels and stable defective pixels. In view of this, the defective pixel detection conditions are set differently between blinking defective pixels and stable defective pixels in the present embodiment.

FIG. 3A is a flowchart illustrating details of the blinking defective pixel detection processing.

If the photographer gives an instruction for switching on the power of the digital still camera 100 by operating a power ON/OFF button included in the operation switch group 132, the CPU 121 starts camera startup processing. The CPU 121 applies the blinking defective pixel detection processing shown in FIG. 3A as part of the startup processing.

As described above, the abnormal output signal level of a blinking defective pixel has almost no temperature dependency. For this reason, in the present embodiment, blinking defective pixel detection is performed at the time of a power ON operation, at which it is assumed that the influence of stable defective pixels is not likely to be felt, and the temperature of the digital still camera (the vicinity of the image sensor 107 in particular) is low.

In step S302, the shutter 102 is closed in order to perform dark image capturing for defective pixel detection. Next, in step S303, a blinking defective pixel detection condition is acquired from the defective pixel detection condition table 144, and a dark image is captured under the acquired defective pixel detection condition.

Photographing conditions for blinking defective pixel detection and photographing conditions for stable defective pixel detection are stored in the defective pixel detection condition table 144. Here, the dark image is captured based on a photographing condition for blinking defective pixel detection.

Whereas a stable defective pixel generates an abnormal output signal level that corresponds to the temperature, the abnormal output signal level of a blinking defective pixel has almost no temperature dependency. In view of this, blinking defective pixels and stable defective pixels can be detected distinctively from each other if blinking defective pixel detection is performed under a condition in which the temperature in the vicinity of the image sensor is low, and the accumulation time is short. For example, with the present embodiment, blinking defective pixel detection is performed by setting the accumulation time to $\frac{1}{1000}$ sec and capturing a dark RAW image at a temperature of 25° C. or lower.

On the other hand, blinking defective pixels have the characteristic of non-stably outputting an abnormal output signal. In view of this, image capturing is performed multiple times (e.g., 32 times in the present embodiment) in a detection period, and the abnormal output signal level of blinking defective pixels is detected with a peak hold method based on the highest output level of pixels in the multiple captured images that are obtained.

Although the precision of blinking defective pixel detection rises the more times image capturing for blinking defective pixel detection is performed, the total image capturing time required for detection grows longer. The number of times that image capturing is performed is therefore set in consideration of detection precision and the total image capturing time.

The CPU 121 checks whether the temperature detected by the temperature detection portion 146 satisfies the photographing condition (25° C. or lower in the present embodiment). If the photographing condition is satisfied, control is performed so as to apply image capturing with the designated accumulation time (electronic shutter speed: $\frac{1}{1000}$ sec). The dark image data obtained by this image capturing is then temporarily stored in the image memory 142. This capturing of a dark image and storage of dark image data is applied repeatedly (32 times in the present embodiment).

Next, the CPU 121 determines whether each focus-detection pixel is a blinking defective pixel by applying the processing of steps S304 to S308. The positions of the focus-detection pixels can be stored in advance.

In step S304, a difference (absolute value) D between the value of a pixel targeted for defective pixel determination and the average value of multiple focus-detection pixels surrounding the targeted pixel is obtained by the CPU 121 as the abnormal output signal level (mV). In step S305, the CPU 121 determines that the targeted pixel is a defective pixel if the difference D is greater than or equal to a defective pixel threshold value. Note that although the focus-detection pixels are configured by two types of pixels (A image pixels and B image pixels) that are eccentric in different directions in the light receiving portion, the focus-detection pixels used here for the calculation of the average value are assumed to be focus-detection pixels of the same type as the targeted pixel.

FIGS. 4A and 4B show examples of blinking defective pixel determination threshold values Ktn and stable defective pixel determination threshold values Kun of the present embodiment. In these figures, eight levels of determination threshold values, namely Kt1 to K8 and Ku1 to Ku8, are set corresponding to the abnormal output signal levels (mV) of defective pixels. In the case where multilevel determination threshold values are set in this way, the targeted pixel is determined to be a normal pixel if the lowest threshold value (the threshold value corresponding to the lowest defect level) is not satisfied, and otherwise, the fact that the targeted pixel is a defective pixel and its defect level are determined at the same time according to the threshold value that is satisfied.

The defective pixel determination threshold values Ktn and Kun may be determined in advance using the results of capturing images under predetermined photographing conditions. Note that since the abnormal output level of blinking defective pixels has almost no dependence on temperature and charge accumulation time, the blinking defective pixel determination threshold values Ktn are set in smaller value increments than the determination threshold values Kun for stable defective pixels, whose abnormal output level is dependent on temperature and charge accumulation time.

In step S306, the CPU 121 stores the following in the defective pixel information memory 143 according to the defective pixel determination results.

(1) Defect level (3-bit ID)
(2) Information specifying the position of the defective pixel among the pixels included in the image sensor (address information)
(3) ID identifying the type of defective pixel (stable defective pixel or blinking defective pixel)

In step S307, the CPU 121 determines that a focus-detection pixel that does not satisfy any of the determination threshold values is a normal pixel. No information in particular needs to be stored for a normal pixel.

Note that although defective pixel determination processing is actually performed for image capturing pixels as well, such processing will not be described here since it is not directly related to the present invention.

The CPU 121 repeats the above-described processing of steps S304 to S308 for all of the focus-detection pixels, and then ends the blinking defective pixel detection.

Next, details of the stable defective pixel detection processing will be described with reference to the flowchart shown in FIG. 3B. FIG. 3B is a flowchart illustrating details of the stable defective pixel detection processing.

If the photographer gives an instruction for switching off the power of the camera 100 by operating the power ON/OFF button included in the operation switch group 132, the CPU 121 starts camera operation end processing. The CPU 121 applies the stable defective pixel detection processing shown in FIG. 3B as part of the operation end processing.

As previously described, the abnormal output signal level of stable defective pixels has temperature dependency and is easier to detect when the temperature is high. In view of this, stable defective pixel detection is performed at the time of the camera power off operation, at which it is assumed that the temperature of the camera (the vicinity of the image sensor 107 in particular) is relatively high.

In steps S312 to S318, the CPU 121 performs stable defective pixel detection similarly to steps S302 to S308 in the blinking defective pixel detection processing.

However, the dark image photographing condition in step S313 is different, and in particular, a highest value does not need to be obtained for the pixels since image capturing only needs to be performed one time. This is because stable defective pixels always output an abnormal output signal. Also, step S315 is different in that the determination threshold values Kun for stable defective pixel detection in FIG. 4B are used.

In this way, defective pixel information for blinking defective pixels and stable defective pixels, which have different dependency on temperature and charge accumulation time, is recorded in the defective pixel information memory 143.

Note that although the case of performing blinking defective pixel detection processing when the camera is powered on and performing stable defective pixel detection processing when the camera is powered off is described in the present embodiment, the timing at which blinking defective pixel detection processing and stable defective pixel detection processing are applied can be set arbitrarily. For example, they may be applied during factory adjustment before the digital still camera is shipped, or a configuration is possible in which it is determined whether the temperature of the image sensor 107 satisfies a photographing condition, and they are applied if the photographing condition is satisfied.

Image Sensor Configuration

The following describes the image sensor 107 and the imaging pixels and the focus-detection pixels that configure the image sensor 107.

Figure 5:
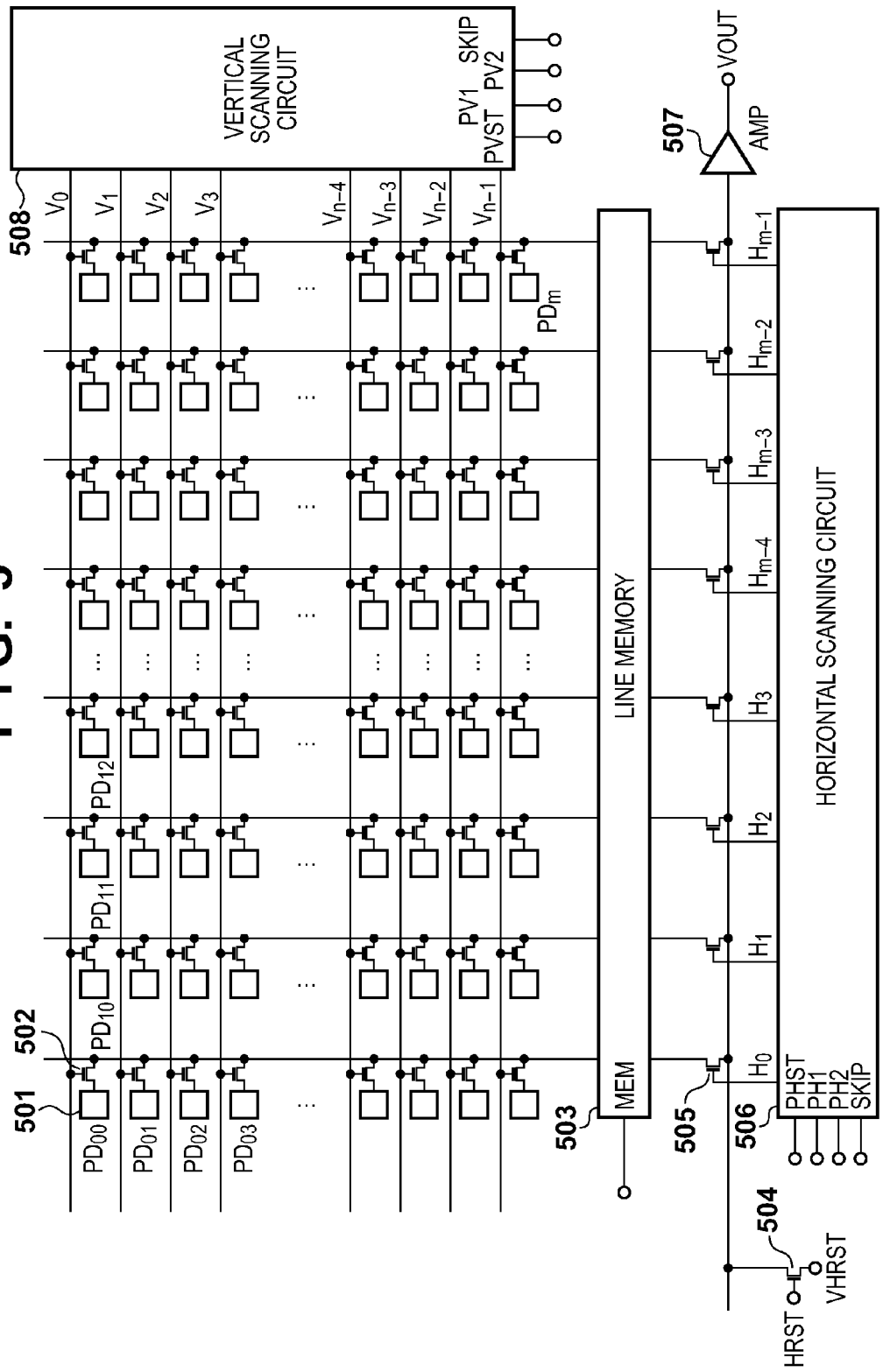
FIG. 5 is a block diagram showing an example of a configuration of a portion of the image sensor according to the embodiment of the present invention.

FIG. 5 is a block diagram showing an example of the configuration of a portion of the image sensor 107. Note that FIG. 5 shows the minimum configuration required for describing readout operations, and pixel reset signals and the like are not shown. A photoelectric conversion portion 501 is configured by a photodiode, a pixel amplifier, reset switch, and the like. Note that in the following description, photoelectric conversion portions 501 are arranged two-dimensionally in the image sensor 107, with m portions in the X direction and n portions in the Y direction, and the notation $PD_{mn}$ is used when individually specifying photoelectric conversion portions 501. Here, m=0, 1, . . . , m−1, and n=0, 1, . . . , n−1. Note that address are shown for only some of the photoelectric conversion portions 501 in FIG. 5 so that the figure does not become complicated.

A switch 502 is provided for each photoelectric conversion portion 501, and the switches 502 select the output of the photoelectric conversion portions 501. The switches 502 are selected one row at a time by a vertical scanning circuit 508.

A line memory 503 is for temporarily storing output from the photoelectric conversion portions 501, and stores output from one row-worth of photoelectric conversion portions that were selected by the vertical scanning circuit. A capacitor is normally used.

A switch 504 is a switch that is connected to a horizontal output line and is for resetting the horizontal output line to a predetermined potential VHRST, and the switch 504 is controlled by a signal HRST.

Switches 505 ($H_0$ to $H_{m-1}$) are provided one each for m outputs of the line memory 503. When a later-described horizontal scanning circuit 506 sequentially scans the switches 505 beginning with $H_0$, the output of the photoelectric conversion portions 501 stored in the line memory 503 is sequentially output to the horizontal output line via the switches 505, and thus photoelectric conversion output is read out one row at a time.

The horizontal scanning circuit 506 sequentially switches on the switches 505 so as to cause the output of the photoelectric conversion portions 501 stored in the line memory 503 to be sequentially output to the horizontal output line. A signal PHST is data input, and PH1 and PH2 are shift clock inputs; also, when PH1=H, data is reset, and data is latched at PH2. The switches 505 can be sequentially switched on in order from $H_0$ to $H_{m-1}$ by inputting a shift clock to PH1 and PH2 of the horizontal scanning circuit 506 so as to sequentially shift PHST. SKIP is a control terminal input for setting thinning readout in the horizontal scanning circuit 506. By inputting an H level signal to SKIP, the horizontal scanning circuit 506 can be caused to skip scanning at a predetermined interval, thus realizing thinning readout.

The vertical scanning circuit 508 sequentially outputs $V_0$ to $V_{n-1}$, and thus the switches 502 connected to the photoelectric conversion portions 501 are selected one line at a time. Similarly to the horizontal scanning circuit 506, the vertical scanning circuit 508 is controlled by data input PVST, shift clocks PV1 and PV2, and SKIP for setting thinning readout. Operations for control input will not be described in detail here since they are similar to those for the horizontal scanning circuit 506.

Pixel Configuration

FIGS. 6A, 6B, 7A, and 7B are diagrams showing examples of the structure of imaging pixels and focus-detection pixels. The image sensor 107 of the present embodiment employs a Bayer pixel arrangement in which a two-row by two-column group of four pixels serves as one unit, two pixels having G (green) spectral sensitivity being arranged as the pixels at two opposing corners, and two pixels respectively having R (red) and B (blue) spectral sensitivity being arranged as the other two pixels. Some of the pixels among the pixels in the Bayer arrangement are focus-detection pixels. These focus-detection pixels are arranged discretely.

FIG. 6A is a plan view of a two-column by two-row group of imaging pixels. As described above, with the Bayer arrangement, two G pixels are arranged diagonally, and an R pixel and a B pixel are arranged as the other two pixels. This two-row by two-column arrangement is repeated over the entirety of the image sensor 107.

FIG. 6B is a diagram showing a cross-section taken along A-A in FIG. 6A and optical paths from the imaging optical system.

ML denotes on-chip microlenses arranged at the front of each pixel, $CF_R$ denotes an R (red) color filter, and $CF_G$ denotes a G (green) color filter. PD schematically illustrates photoelectric conversion portions 501, and CL denotes a wiring layer for forming the signal lines that transmit various types of signals in the CMOS image sensor. TL schematically illustrates the imaging optical system.

Here, the on-chip microlenses ML and the photoelectric conversion portions PD of the imaging pixels are configured such that luminous flux that has passed through the imaging optical system TL is picked up as effectively as possible. In other words, an exit pupil EP of the imaging optical system TL and the photoelectric conversion portions PD are in a conjugate relationship due to the microlenses ML, and the effective area of the photoelectric conversion portions PD is designed so as to be large. Also, although luminous flux that enters the R pixel is shown in FIG. 6B, the G pixels and the B (blue) pixels also have the same structure. Accordingly, the exit pupil EP that corresponds to the RGB pixels for imaging has a large diameter, and luminous flux from the subject is efficiently picked up, thus improving the S/N ratio of the image signal.

Figure 7B:
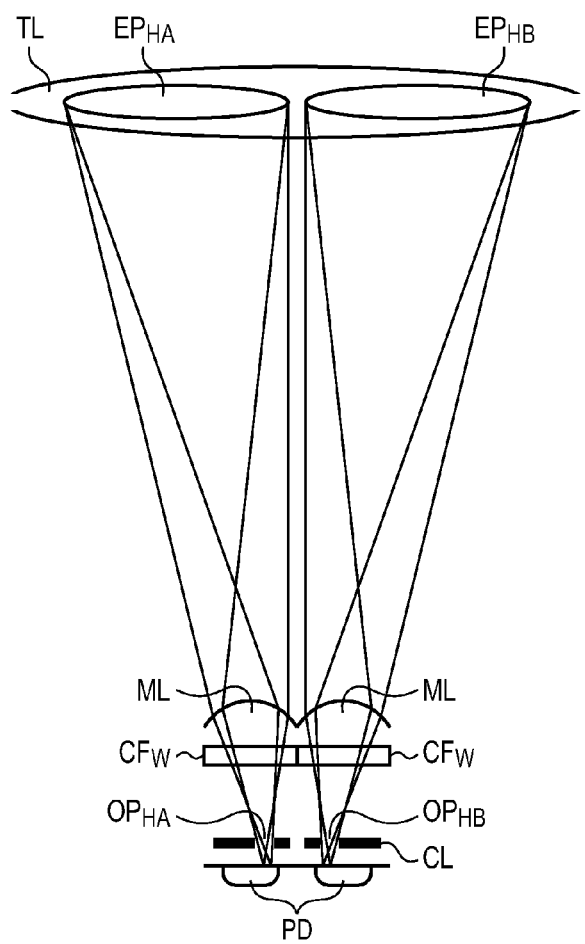
FIGS. 7A and 7B are a plan view and a cross-sectional view showing an example of a structure of focus-detection pixels of the image sensor according to the embodiment of the present invention.
Figure 7A:
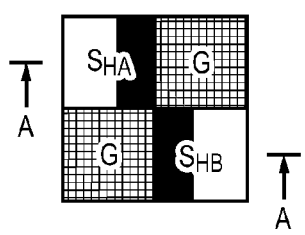

FIG. 7A is a plan view of a two-column by two-row group of pixels that includes a pair of focus-detection pixels. In the case of obtaining an image signal for recording or display, the main component of luminance information is acquired using the G pixels. Human image recognition has the characteristic of high sensitivity to luminance information, and therefore image quality degradation is likely to be perceived if G pixels are lost. On the other hand, the pixels other than G pixels (i.e., the R pixels or the B pixels) are pixels for acquiring color information (color difference information), and since human image recognition has the characteristic of low sensitivity to color information, image degradation is not likely to be noticed even if pixels for acquiring color information are lost to a certain extent. In view of this, in the present embodiment, the G pixels among the two-row by two-column group of pixels are left as imaging pixels, and a pair of focus-detection pixels $S_{HA}$ and $S_{HB}$ are arranged at the positions of the R pixel and the B pixel.

FIG. 7B is a diagram showing a cross-section taken along A-A in FIG. 7A (i.e., a cross-section of the pair of focus-detection pixels) and optical paths from the imaging optical system.

The microlenses ML and the photoelectric conversion portions PD have the same structure as in the imaging pixels shown in FIG. 6B. Since the signals from the focus-detection pixels are not used as image signals in the present embodiment, an achromatic transparent filter $CF_W$ (white) is arranged in place of the color filters for color separation. Also, since pupil division is performed with the pixels, the openings in the wiring layer CL are arranged so as to be eccentric in one direction with respect to the center line of the microlenses ML. Specifically, the openings for the focus-detection pixel $S_{HA}$ and the focus-detection pixel $S_{HB}$ that configure the pair of focus-detection pixels are eccentric in mutually different directions.

Specifically, an opening portion $OP_{HA}$ for the focus-detection pixel $S_{HA}$ is eccentric toward the right side, and therefore luminous flux that has passed through a left-side exit pupil $EP_{HA}$ of the imaging optical system TL is received. Similarly, an opening portion $OP_{HB}$ for the focus-detection pixel $S_{HB}$ is eccentric toward the left side, and therefore luminous flux that has passed through a right-side exit pupil $EP_{HB}$ of the imaging optical system TL is received. An A image waveform (first image waveform) is the luminance waveform acquired by multiple focus-detection pixels $S_{HA}$ that are regularly aligned in the horizontal direction. Also, a B image waveform (second image waveform) is the luminance waveform acquired by multiple focus-detection pixels $S_{HB}$ that are regularly aligned in the horizontal direction. A subject image defocus amount can be calculated by detecting the relative positions of the A image waveform and the B image waveform and multiplying the image shift amount by a conversion coefficient.

Influence of Focus-Detection Pixels

The following describes factors of image quality degradation that arises due to arranging focus-detection pixels among the pixels configuring the image sensor. As described above, the photoelectric conversion portions of the focus-detection pixels are eccentric to the optical axes of the on-chip microlenses, and therefore the opening shape and the opening barycentric position are different from those of the imaging pixels. The angle of incidence distribution of light beams that enter via the imaging optical system is therefore different from that of the imaging pixels. Furthermore, since the color filters of the focus-detection pixels are achromatic or not provided, the spectral sensitivity characteristics are also different from those of the imaging pixels.

Due to these structural differences, (1) output from the focus-detection pixels and (2) output from imaging pixels that are adjacent or neighboring to the focus-detection pixels have influence on image quality, unlike the case where focus-detection pixels are not arranged. With respect to the influence of focus-detection pixels in (2), due to the structural difference between the imaging pixels and the focus-detection pixels, there is also a difference in the amount of crosstalk on adjacent or neighboring pixels.

The following is a detailed description of factors in the generation of crosstalk. One factor is thought to be that inside the semiconductor substrate that forms a photoelectric conversion portion, electrons generated at the edge and deep inside the photoelectric conversion portion due to incident light spread to the photoelectric conversion portions of surrounding pixels. Another factor is thought to be that light that propagates while reflecting between the semiconductor surface and the light-blocking metal layer formed on the semiconductor surface enters surrounding imaging pixels, and that some of the light that is incident on a focus-detection pixel is reflected by the focus-detection pixel, is again reflected by the cover glass or the like over the sensor package, and then enters surrounding imaging pixels.

The amount of crosstalk due to reflection is dependent on the characteristic of the angle of incident light beams, and this amount of crosstalk tends to rise with a rise in the angle that the incident light beam forms with the optical axis of the microlens. Also, the amount of crosstalk that arises when electrons generated at the edge and deep inside the photoelectric conversion portion spread to surrounding pixels is dependent on the characteristic of the spectral distribution of incident light, and this amount of crosstalk tends to rise with a rise in the amount of incidence of long-wavelength light that penetrates deep inside the semiconductor substrate.

Accordingly, correcting the output of imaging pixels that are adjacent or neighboring to a focus-detection pixel requires estimating the amount of crosstalk in consideration of factors that influence the characteristic of the angle of incident light beams, as well as the characteristic of the spectral distribution of incident light. Note that examples of factors that influence the characteristic of the angle of incident light beams include the aperture opening (F value) of the imaging optical system, the image height at which the focus-detection pixels are arranged, and the shape and barycentric position of the openings of the focus-detection pixels.

Figure 8A:
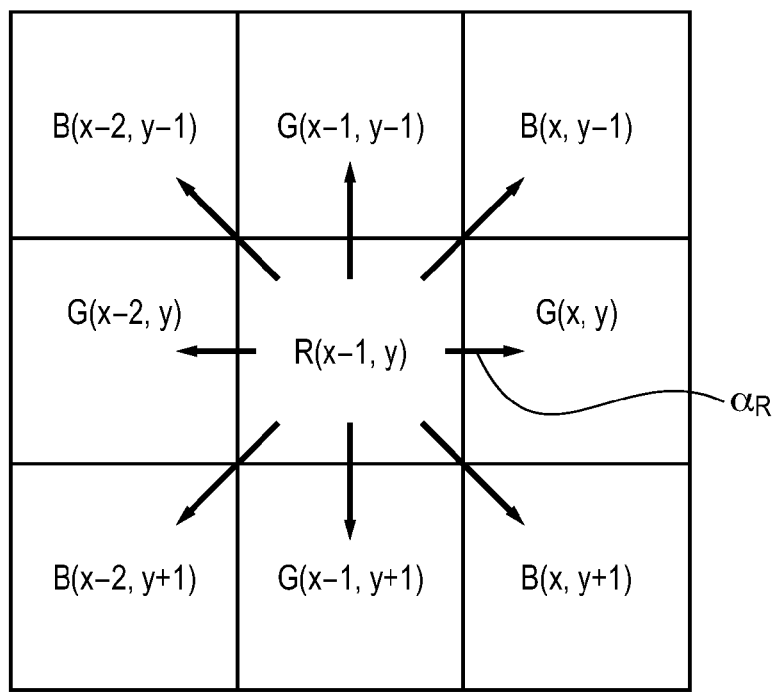
FIG. 8A is a diagram showing a three-row by three-column arrangement of pixels that is configured by only imaging pixels and has an R pixel at the center.
Figure 8B:
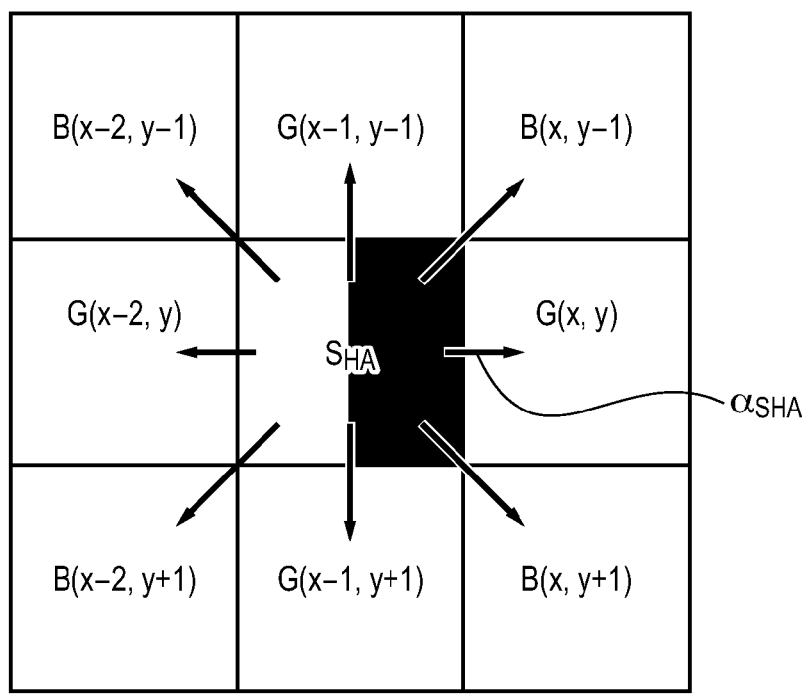
FIG. 8B is a diagram showing an arrangement of pixels in the case where the center pixel in FIG. 8A is a focus-detection pixel.

FIG. 8A shows the arrangement of a three-row by three-column group of pixels that is configured by only imaging pixels and has an R pixel at the center, and FIG. 8B shows a pixel arrangement in which the central pixel in FIG. 8A is a focus-detection pixel. Consider the case of correcting the value of the adjacent pixel G(x,y) to the right of the focus-detection pixel $S_{HA}$ in the pixel arrangement shown in FIG. 8B. Note that the output change amount (correction target amount) of the pixel G(x,y) due to the pixel R(x−1,y) being replaced with the focus-detection pixel $S_{HA}$ is referred to as the crosstalk correction amount.

The output value of the focus-detection pixel $S_{HA}$ in FIG. 8B is $S_{SHA}$. In FIG. 8B, $\alpha_{SHA}$ is the value obtained when the amount of crosstalk on the pixel G(x,y) from the focus-detection pixel $S_{HA}$ is divided by $S_{SHA}$. Similarly, the output value of the imaging pixel R(x−1,y) in FIG. 8A is $S_R$. Here, $\alpha_R$ is the value obtained when the amount of crosstalk on G(x,y) from the imaging pixel R(x−1,y) is divided by $S_R$.

According to these definitions, the amount of crosstalk on the pixel G(x,y) from the focus-detection pixel $S_{HA}$ in FIG. 8B is $S_{SHA} \times \alpha_{SHA}$. Similarly, the amount of crosstalk that leaks from the imaging pixel R(x−1,y) into G(x,y) in FIG. 8A is expressed by $S_R \times \alpha_R$. Accordingly, the crosstalk correction amount $S_C$ with respect to the imaging pixel G(x,y) can be expressed by the following expression.

$$S_C = S_R \times \alpha_R - S_{SHA} \times \alpha_{SHA} \qquad (1)$$

Here, $\alpha_R$ and $\alpha_{SHA}$ can be obtained by creating a table or expression in advance from measured values or calculated values as coefficients corresponding to the characteristic of the spectral distribution of incident light and factors that influence the characteristic of the angle of incident light beams. These coefficients indicate a combination of these factors and a rate (crosstalk rate) indicating the extent of crosstalk on G(x,y) from the output of the pixel R(x−1,y) and $S_{HA}$.

For example, the set value at the time of imaging is used as the aperture F value of the imaging lens. Also, the image height, opening shape, and opening barycentric position of the focus-detection pixel can be stored advance as design values. The spectral distribution characteristic of light that is incident on a focus-detection pixel at the time of imaging can be obtained based on the RGB output of the imaging pixels that surround the focus-detection pixel.

Furthermore, in Expression (1), $S_R$ at the position corresponding to a focus-detection pixel can be estimated using an interpolation operation based on output of the imaging pixels that surround the focus-detection pixel $S_{HA}$. For this reason, using Expression (1) enables correcting the amount of crosstalk from the output of a focus-detection pixel on adjacent imaging pixels.

The present invention suppresses the problem that when correcting the crosstalk correction amount $S_C$ for an imaging pixel that is adjacent or neighboring to a focus-detection pixel, if that focus-detection pixel is a defective pixel, the crosstalk amount is corrected based on output from that defective pixel. The calculation of the crosstalk correction amount in an imaging pixel that is adjacent or neighboring to the focus-detection pixel $S_{HA}$ requires information on the output $S_{SHA}$ from the focus-detection pixel as shown in Expression (1). However, normal output cannot be obtained if the focus-detection pixel $S_{HA}$ is a defective pixel, and therefore it is difficult to correctly estimate the crosstalk correction amount $S_C$. Furthermore, if the defect level of the focus-detection pixel $S_{HA}$ is high, correcting the crosstalk correction amount has the possibility of instead having a negative influence on image quality.

Crosstalk Correction Processing

Figure 9:
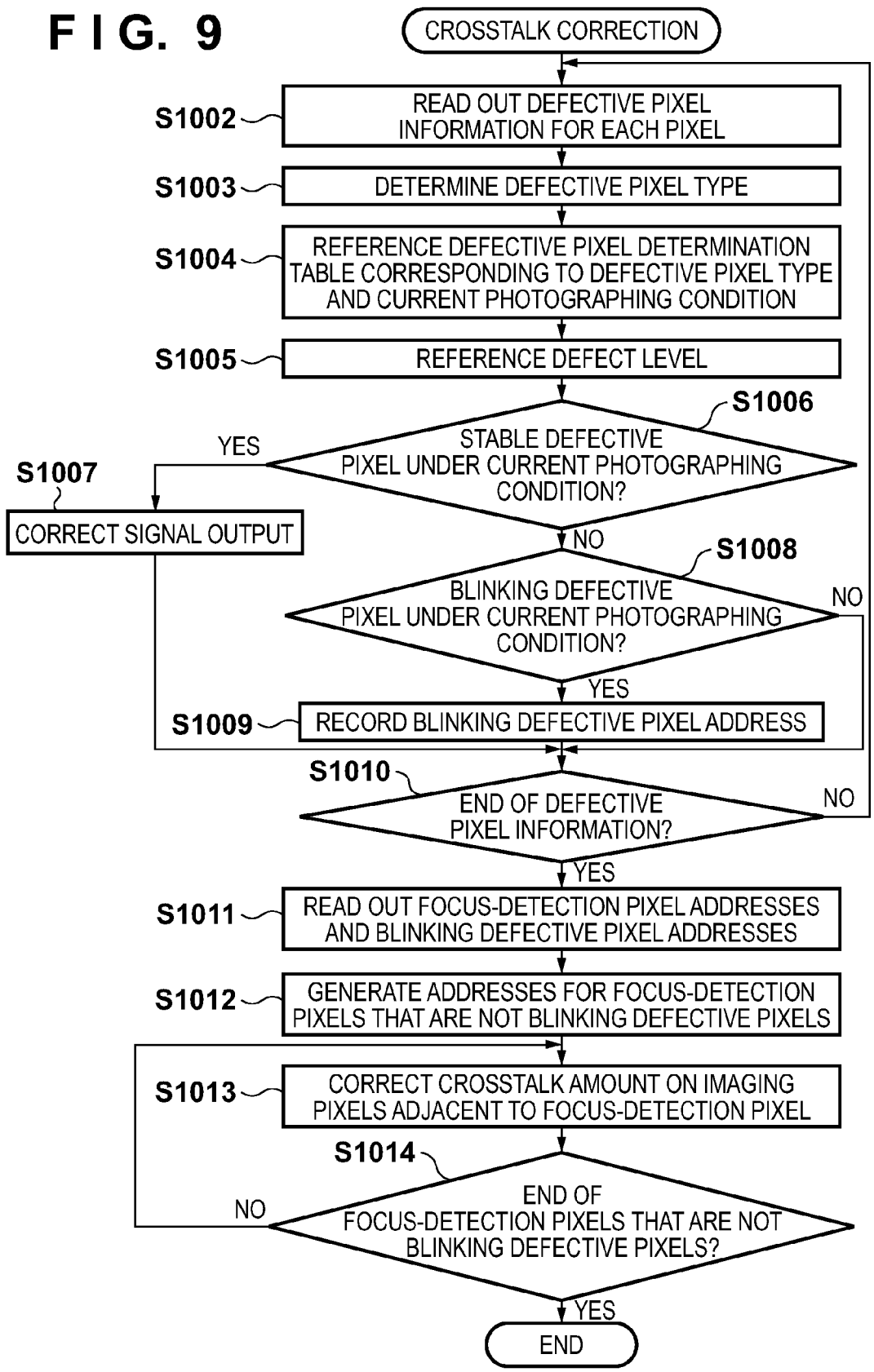
FIG. 9 is a flowchart showing an example of crosstalk correction processing according to the embodiment of the present invention.

The following describes an example of processing for correcting the crosstalk amount of an imaging pixel that is adjacent to a focus-detection pixel in the present embodiment with reference to the flowchart of FIG. 9.

The crosstalk correction processing is mainly applied by the CPU 121. In step S1002, the CPU 121 reads out defective pixel information from the defective pixel information memory 143. In step S1003, the CPU 121 determines the type of defective pixel for the pixel targeted for correction (blinking or stable defective pixel) based on the defective pixel type identification ID included in the defective pixel information.

In step S1004, the CPU 121 references the defective pixel determination table 145 that corresponds to the determined defective pixel type and photographing condition. Then, in step S1005, the CPU 121 determines whether the defect level of the pixel of interest is included among the defect levels at which a pixel is treated as a "defective pixel" under the photographing condition. The defective pixel determination tables 145 are tables for determining that a focus-detection pixel is a defective pixel (the ranges of defect levels) in accordance with photographing conditions of the image targeted for correction. Note that examples of the photographing conditions include the temperature, the charge accumulation time (shutter speed or exposure time), and the ISO sensitivity, but there is no limitation to these examples, and other photographing conditions may be used.

FIGS. 10A to 10D show examples of defective pixel determination tables 145 corresponding to photographing conditions. In FIGS. 10A to 10D, Kt1 to K8 and Ku1 to Ku8 are the same as the determination threshold values Kt1 to Kt8 for blinking defective pixel detection and the determination threshold values Ku1 to Ku8 for stable defective pixel detection shown in FIGS. 4A and 4B. Here, "Kt1" in a defective pixel determination table 145 means that if the highest threshold value (i.e., defect level) that is satisfied by the abnormal output signal level of a blinking defective pixel is Kt1, that blinking defective pixel is determined to be a defective pixel in consideration of the photographing condition. Accordingly, this means that with Kt1 to Kt8 and the described photographing conditions included in the combinations of imaging sensitivity (ISO sensitivity), temperature, and charge accumulation time, blinking defective pixels at all defect levels are determined to be defective pixels. The same follows for Ku1 to Ku8 as well.

FIGS. 10A and 10B show examples of correction tables for stable defective pixels that correspond to the ISO sensitivities 100 and 1600, and FIGS. 10C and 10D show examples of correction tables for blinking defective pixels that correspond to the ISO sensitivities 100 and 1600. Note that although not shown, tables corresponding to other ISO sensitivities are also included among the defective pixel determination tables 145.

The stable defective pixel determination tables shown in FIGS. 10A and 10B are set such that the higher the sensitivity and the temperature, and the longer the charge accumulation time (the slower the electronic shutter speed), the lower the abnormal output signal level (defect level) down to which a pixel is determined to be a defective pixel. This is because stable defective pixels have the characteristic of outputting a higher level of abnormal output signal the higher the sensitivity and the longer the charge accumulation time.

As described above, the abnormal output signal level of blinking defective pixels has almost no dependency on temperature and charge accumulation time. For this reason, in the blinking defective pixel determination tables shown in FIGS. 10C and 10D, the range of abnormal output signal levels (defect levels) at which a pixel is determined to be a defective pixel in consideration of the photographing condition is not dependent on temperature or charge accumulation time. Accordingly, with these defective pixel determination tables, at the same ISO sensitivity, the range of defect levels at which a pixel is determined to be a defective pixel is the same regardless of the temperature and the charge accumulation time. On the other hand, with blinking defective pixels as well, the range of defect levels at which a pixel is determined to be a defective pixel increases as the ISO sensitivity rises, similarly to the case of stable defective pixels.

If the CPU 121 determined in step S1006 of FIG. 9 that the pixel of interest (pixel targeted for correction) is a stable defective pixel under the current photographing condition, the procedure moves to step S1007 in which the output signal of the focus-detection pixel that was determined to be a stable defective pixel is corrected.

In the present embodiment, the CPU 121 corrects the offset amount estimated from the defect level (influence of the defect) for the output signal of the focus-detection pixel that was determined to be a stable defective pixel. In step S1013, the CPU 121 then corrects the amount of crosstalk on adjacent imaging pixels using the corrected signal as $S_{SHA}$ in Expression (1).

Also, if it was not determined in step S1006 that the pixel of interest is a stable defective pixel, the CPU 121 moves to step S1008 in which the CPU 121 checks whether the pixel of interest was determined to be a blinking defective pixel. If it was determined that the pixel of interest is a blinking defective pixel, the CPU 121 moves to step S1009 in which information (an address) indicating the position of the blinking defective pixel is stored in the storage portion 141.

Unlike the case of stable defective pixels, with blinking defective pixels, the correction of the output signal of a focus-detection pixel is difficult. Also, since the abnormality is not stable, a focus-detection pixel that is a blinking defective pixel is thought to have very little influence on image quality. Since little effect can be expected relative to the amount of computation required for the correction of the output signal in this way, in the present embodiment, the amount of crosstalk on adjacent imaging pixels is not corrected for focus-detection pixels that are determined to be blinking defective pixels.

In the case of a focus-detection pixel that was not determined to be a defective pixel under the current photographing condition, the CPU 121 corrects the amount of crosstalk on adjacent imaging pixels in step S1013 using the output signal of the focus-detection pixel as $S_{SHA}$ in Expression (1) without correcting it.

In step S1010, the CPU 121 determines whether the defective pixel determination taking into account the photographing condition has been applied to all of the pixels that are both focus-detection pixels and defective pixels, moves to step S1011 in the case of an affirmative determination, and moves to step S1002 in the case of a negative determination. In step S1012, the CPU 121 reads the address information of the focus-detection pixels and the address information of the focus-detection pixels that were determined to be a blinking defective pixel in S1008. The CPU 121 then generates address information for the focus-detection pixels that are not blinking defective pixels (the focus-detection pixels that were determined to not be defective pixels or were determined to be stable defective pixels) based on the address information that was read.

In steps S1013 and S1014, the CPU 121 performs crosstalk amount correction according to Expression (1) on the imaging pixels that are adjacent to the focus-detection pixels recorded in the address information that was generated in step S1012.

Camera Operations

Figure 11:
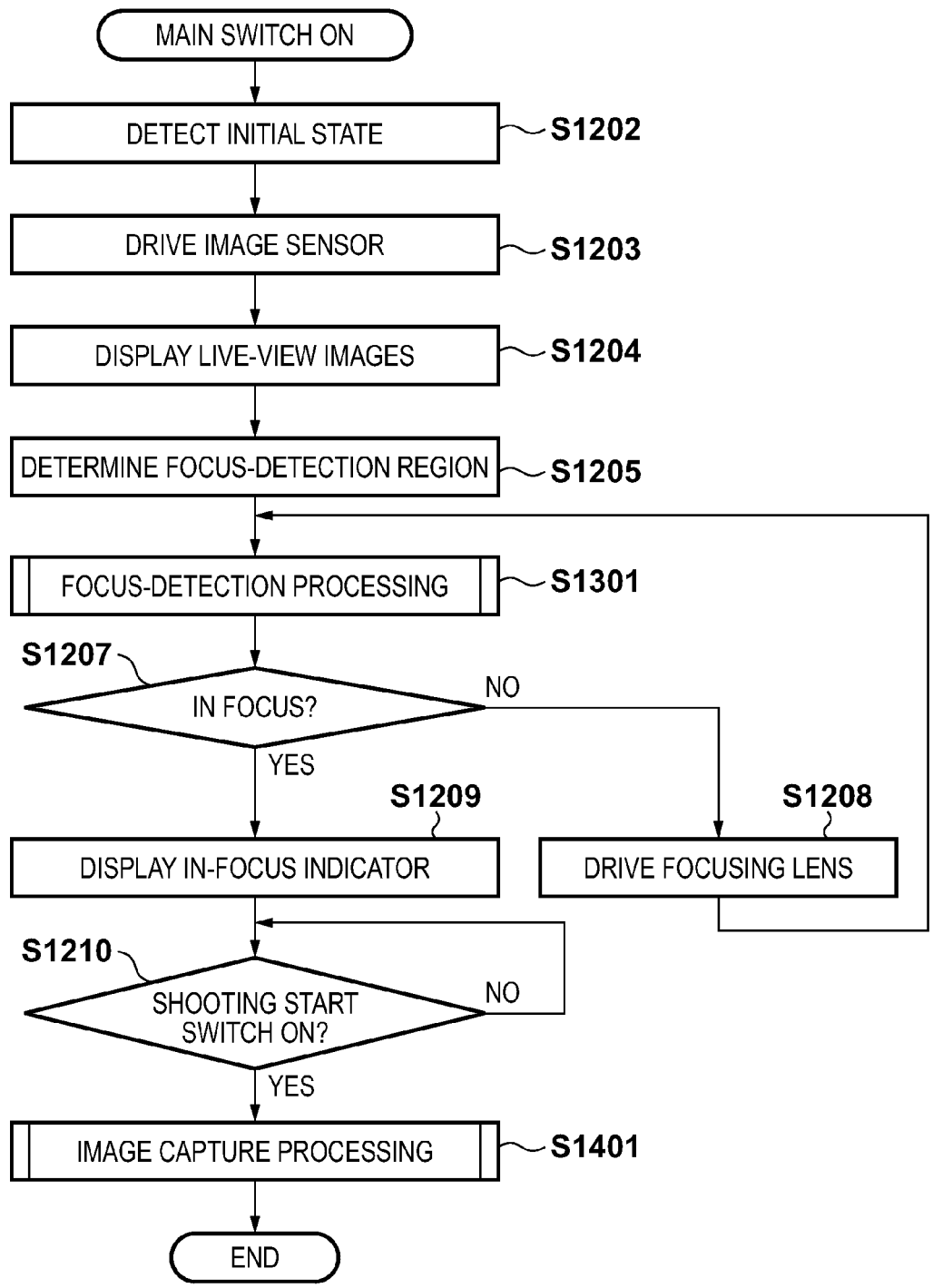
FIG. 11 is a flowchart showing overall operations of a camera according to the embodiment of the present invention.

FIG. 11 is a flowchart showing overall operations of the camera 100 of the present embodiment.

If the photographer performs an ON operation on the power switch of the camera, the CPU 121 applies an initial operation in step S1202. The initial operation includes an operation check with respect to the image sensor 107 and the actuators 111, 112, and 114 in the camera 100, initialization of the content of the storage portion 141 and application programs, and the like.

In the present embodiment, when the power switch is switched on, the camera 100 operates in the shooting mode. Accordingly, in step S1203, the CPU 121 starts shooting low-resolution moving images (live-view images) using the image sensor 107, and outputs the live-view images to the display 131 in step S1204. The photographer views the live-view images displayed on the display 131 and determines the shooting composition. A display indicating various types of states (e.g., the photographing condition that is set) of the camera 100 may be superimposed on the live-view images.

In step S1205, the CPU 121 determines a focus detection region according to a predetermined setting and applies focus detection processing (step S1301).

Figure 12:
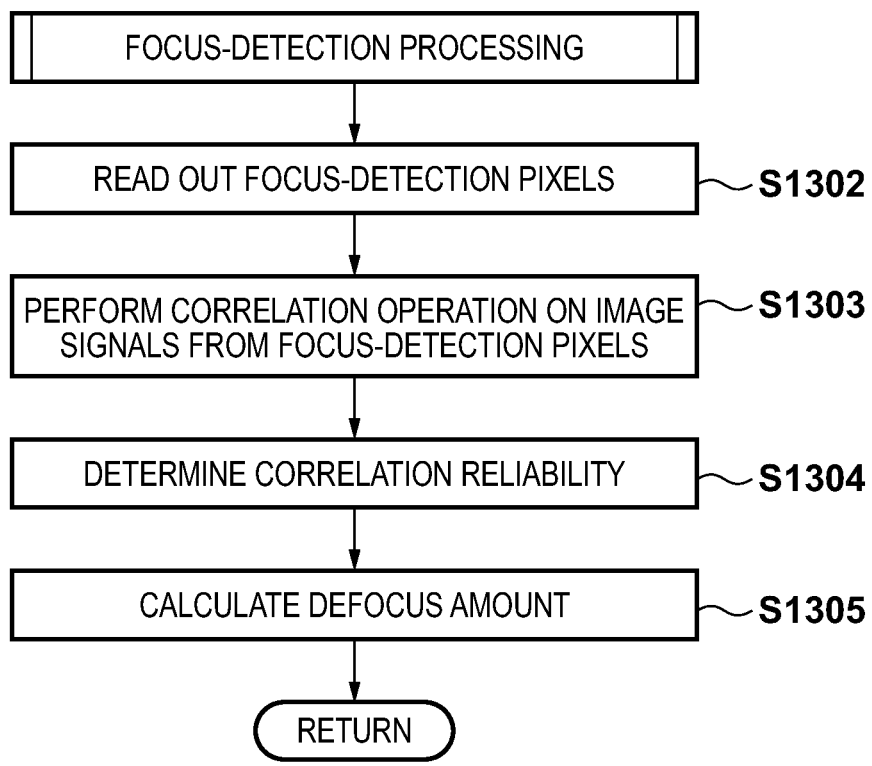
FIG. 12 is a flowchart showing details of focus detection processing according to the embodiment of the present invention.

FIG. 12 is a flowchart showing details of the focus detection processing in step S1301. In step S1302, the CPU 121 reads signals from the focus-detection pixels that are included in the focus detection region that was determined in step S1205. In step S1303, the CPU 121 performs a correlation operation on a pair of image signals respectively obtained from the focus-detection pixels of the same type, and calculates the amount of relative position shift. In step S1304, the CPU 121 determines the reliability of the correlation operation result. This reliability indicates the degree of coincidence of the pair of image signals, and the reliability of the focus detection result is generally higher the higher the degree of coincidence is. In view of this, if multiple focus detection regions have been selected, the correlation operation result having the highest reliability is used with priority.

In step S1305, the CPU 121 calculates the defocus amount based on the correlation operation result that has the highest reliability, ends the focus detection processing, and moves to step S1207 in FIG. 11.

In step S1207 in FIG. 11, the CPU 121 determines whether the defocus amount that was calculated in step S1305 in FIG. 12 is less than or equal to a predetermined acceptable value. If the defocus amount is greater than the acceptable value, the CPU 121 determines that focus has not been achieved, and drives the third lens group 105, which is the focusing lens, according to the defocus amount via the focus actuator 114 in step S1208. The CPU 121 then repeatedly applies the processing of steps S1301, S1207, and S1208 until the defocus amount obtained by the focus detection processing is less than or equal to the acceptable value. If it was determined in step S1207 that the focus state was achieved, the CPU 121 displays an in-focus indicator on the live-view images in step S1209, and then moves to step S1210.

In step S1210, the CPU 121 determines whether an ON operation was performed on a shooting start switch included in the operation switch group 132, and maintains the shooting standby state in step S1210 if the ON operation was not performed. If the ON operation was performed on the shooting start switch in step S1210, the CPU 121 applies image capture processing in step S1401.

Figure 13:
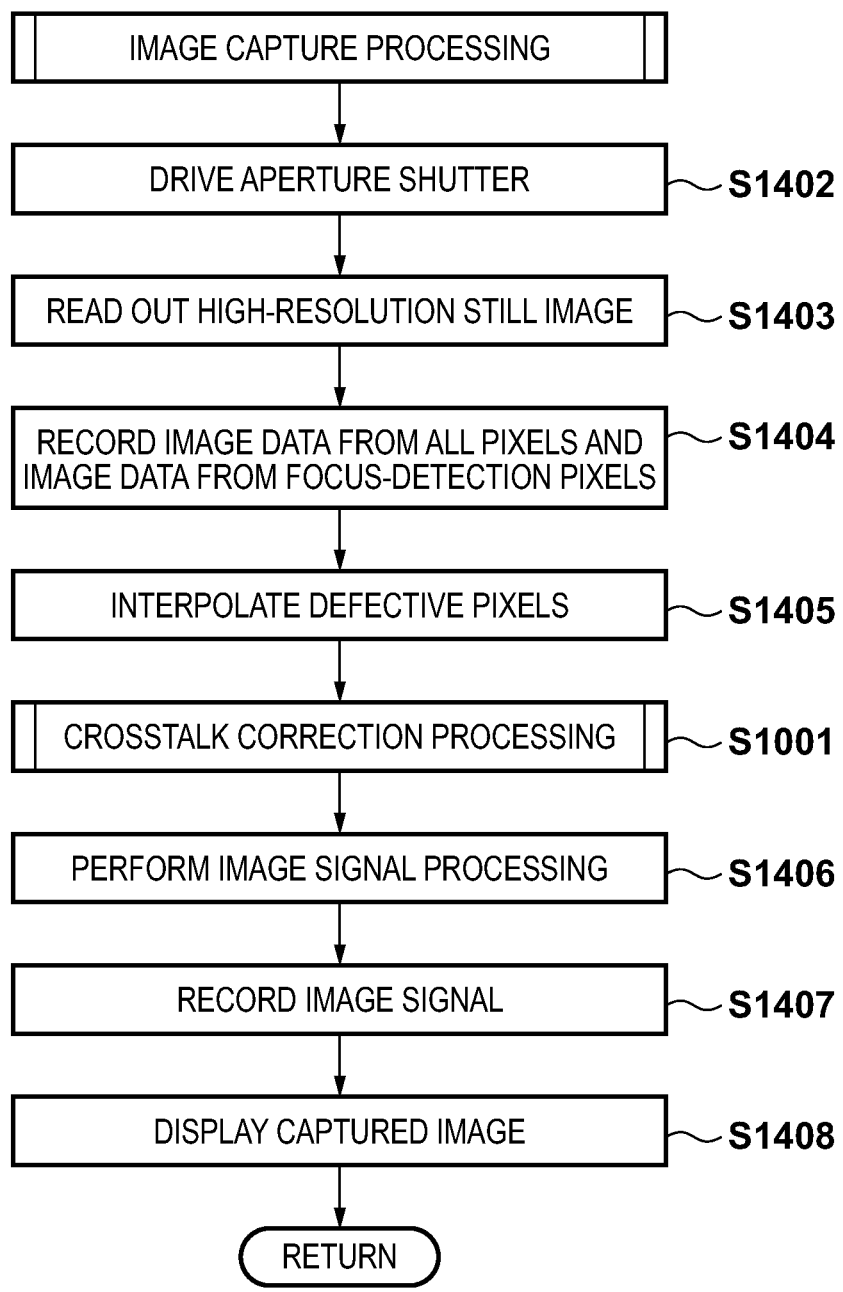
FIG. 13 is a flowchart showing details of image capture processing according to the embodiment of the present invention.

FIG. 13 is a flowchart showing details of the image capture processing in step S1401. If the shooting start switch was operated, in step S1402, the CPU 121 controls the opening diameter and open/close timing of the shutter 102 that also functions as the aperture via the aperture shutter actuator 112. In step S1403, the CPU 121 performs image readout for high-resolution still image shooting, that is to say, reads out all of the pixels of the image sensor 107. In step S1404, the CPU 121 separately stores only the output signals from the focus-detection pixels among all of the pixel output that was read out in the storage portion 141, for example, in order to correct the amount of crosstalk on pixels adjacent to the focus-detection pixels that are not blinking defective pixels.

In step S1407, the CPU 121 performs lost pixel interpolation on the image signals of all of the pixels that were read out. Specifically, the output of the focus-detection pixels does not have RGB color information for image capture, and the focus-detection pixels correspond to defective pixels in terms of obtaining an image, and therefore image signals are generated by interpolation from the information of surrounding imaging pixels. Next, in step S1001, the CPU 121 corrects the amount of crosstalk on imaging pixels that are adjacent the focus-detection pixels as previously described with reference to FIG. 9.

Specifically, the CPU 121 uses Expression (1) to correct the amount of crosstalk on imaging pixels that are adjacent to the focus-detection pixels other than the focus-detection pixels that were determined to be blinking defective pixels. The crosstalk rates $\alpha_R$ and $\alpha_{SHA}$ are determined using a crosstalk rate table or expression based on the photographing condition of the image targeted for correction. Correction is performed based on Expression (1), using the image signals from the focus-detection pixels, the image signals from all of the pixels, and the crosstalk rates.

In step S1406, the CPU 121 performs image processing such as image © correction and edge enhancement, and then records a captured image in the recording medium 133 in step S1407. In step S1408, the captured image is displayed on the display 131, and image capture processing ends.

When the image capture processing of step S1401 ends, the CPU 121 ends this series of processing.

The embodiment described above is merely a representative example, and various variations and modifications can be applied to embodiments within the scope of the invention when carrying out the present invention.

Variation

In the embodiment described above, in the case of a pixel that was determined to be a stable defective pixel based on determination criteria that correspond to the photographing condition, the output signal of that pixel is corrected according to the defect level, and then the amount of crosstalk on adjacent imaging pixels is corrected.

However, processing for correcting the output signal of a stable defective pixel according to the defect level is not necessarily easy. For this reason, even if crosstalk correction is not performed for focus-detection pixels that were determined to be a stable defective pixel, an effect of suppressing influence on image quality is obtained in comparison to conventional technology in which crosstalk correction is performed using abnormal output signals. For this reason, a configuration is possible in which focus-detection pixels that were determined to be stable defective pixels are also not subjected to crosstalk amount correction depending on the capability and load status of the apparatus that performs crosstalk amount correction.

Note that in the case of the imaging pixels that are adjacent to the focus-detection pixels that are not subjected to crosstalk amount correction, interpolation processing may be carried out based on output data from surrounding imaging pixels of the same color. For example, output data is generated for a pixel targeted for interpolation based on the average value of the output data of surrounding imaging pixels that are same color as the pixel targeted for interpolation and not adjacent to a focus-detection pixel. This enables reducing image quality degradation in the vicinity of focus-detection pixels.

According to the present embodiment, in an image processing apparatus that corrects an image obtained by an image sensor that has focus-detection pixels, if a focus-detection pixel is a defective pixel, whether or not crosstalk amount correction is to be performed on neighboring imaging pixels is determined according to the defect level and the photographing condition of the image that is to be corrected. This enables suppressing image quality degradation in the vicinity of focus-detection pixels due to crosstalk amount correction performed based on the abnormal output levels from the focus-detection pixels.

Variation 2

In the embodiment described above, in Expression (1), estimated output $S_R$ at the position corresponding to a focus-detection pixel $S_{HA}$ is estimated using an interpolation operation based on output from the adjacent or neighboring imaging pixels that surround the focus-detection pixel $S_{HA}$. There is possibility that a defective pixel is included among the imaging pixels that are used when calculating the estimated output $S_R$ at the position corresponding to a focus-detection pixel. If the output of the imaging pixel that is a defective pixel can be excluded when performing interpolation calculation, the effects of the present invention can be obtained by only determining whether focus-detection pixels are defective pixels as in the embodiment described above.

However, depending on the capability and load status of the apparatus that performs crosstalk amount correction, there are cases where imaging pixels that are used in interpolation calculation are limited. In such cases, similarly to the case of determining whether a focus-detection pixel is a defective pixel as in the embodiment described above, it is necessary to also determine whether the respective imaging pixels to be used in interpolation calculation are defective pixels, and prevent the application of crosstalk correction if the focus-detection or any of the surrounding imaging pixels is a defective pixel.

Figure 14:
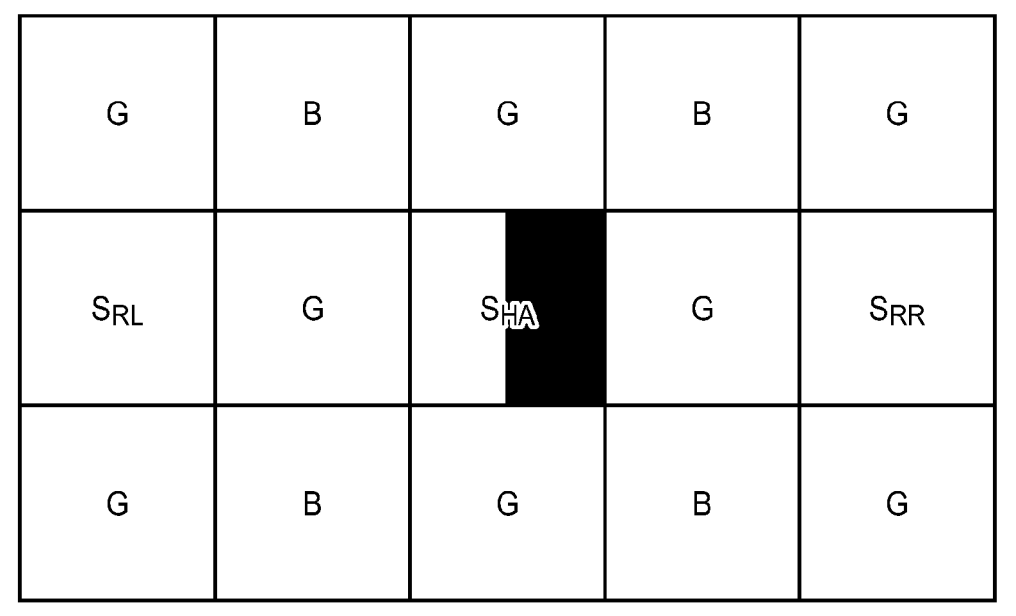

The present variation describes the case where interpolation calculation is performed for the estimated output $S_R$ at the position that corresponds to a focus-detection pixel, based on the average value of adjacent pixels $S_{RL}$ and $S_{RR}$ of the same color as the focus-detection pixel and on the left and right respectively of the focus-detection pixel as shown in FIG. 14. Expression (2) is an interpolation calculation expression for obtaining the estimated output $S_R$ at the position corresponding to a focus-detection pixel.

$$S_R=(S_{RL}+S_{RR})/2 \qquad (2)$$

Defective Pixel Detection Processing

Figure 3B:
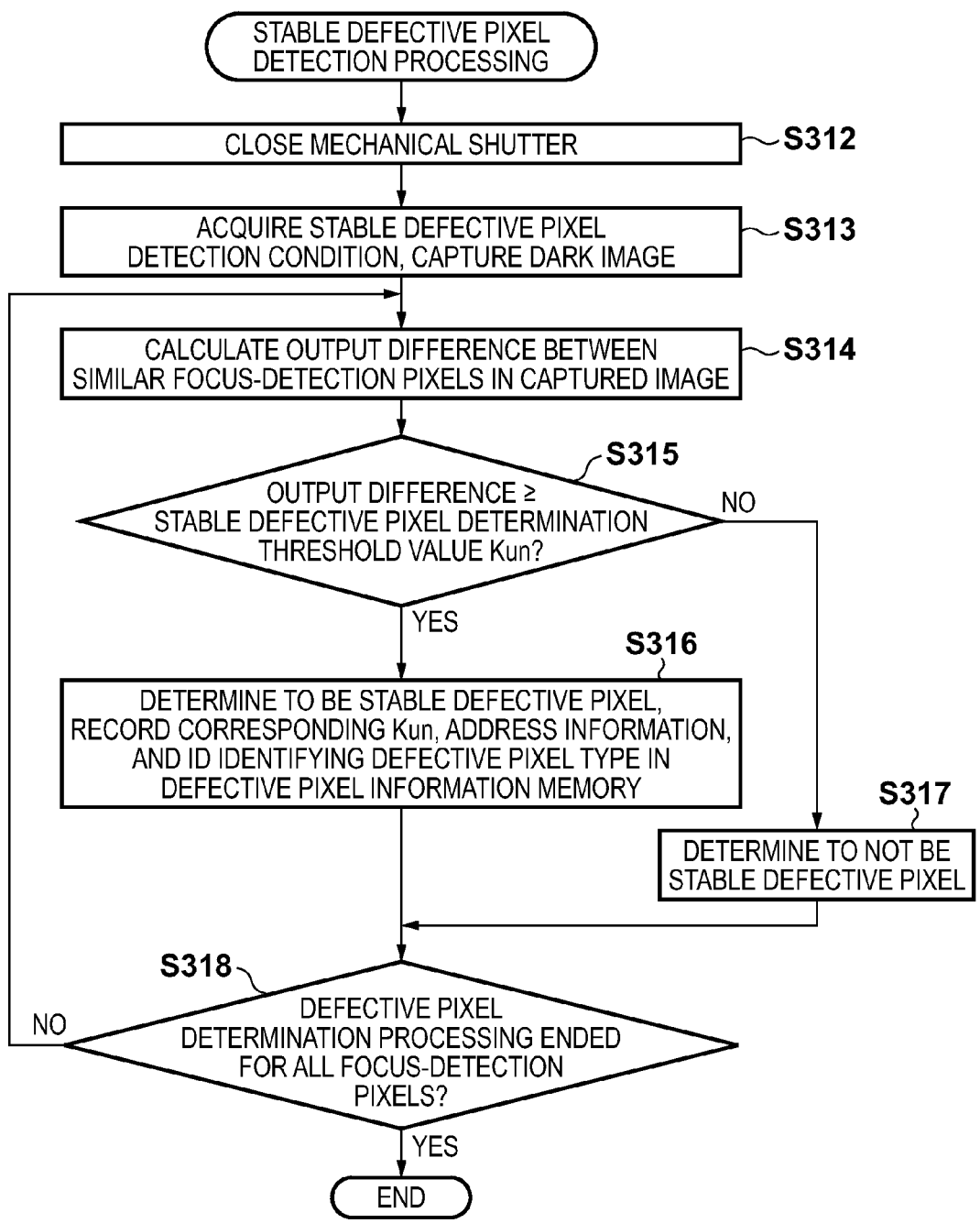

Defective pixel detection processing with respect to focus-detection pixels has been described in the above embodiment with reference to FIGS. 3A and 3B. In the present variation, defective pixel detection processing is also performed with respect to adjacent pixels $S_{RL}$ and $S_{RR}$ of the same color as a focus-detection pixel and on the left and right respectively of the focus-detection pixel. This processing will not be described here since it is the same as that of the defective pixel detection processing performed on focus detection pixels.

Crosstalk Correction Processing

Figure 15A:
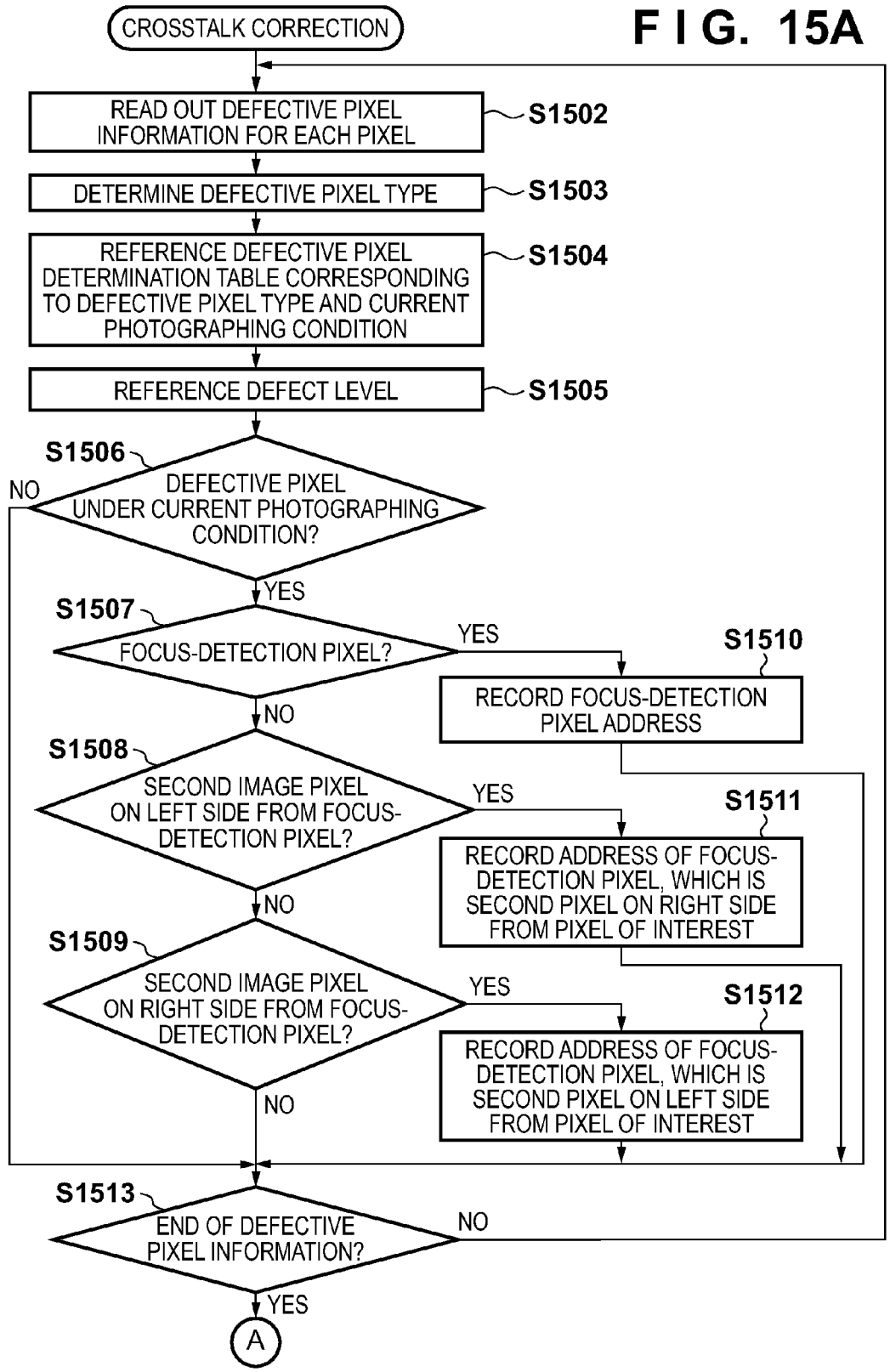
FIGS. 15A and 15B are flowcharts showing an example of crosstalk correction processing according to a variation of the embodiment of the present invention.
Figure 15B:
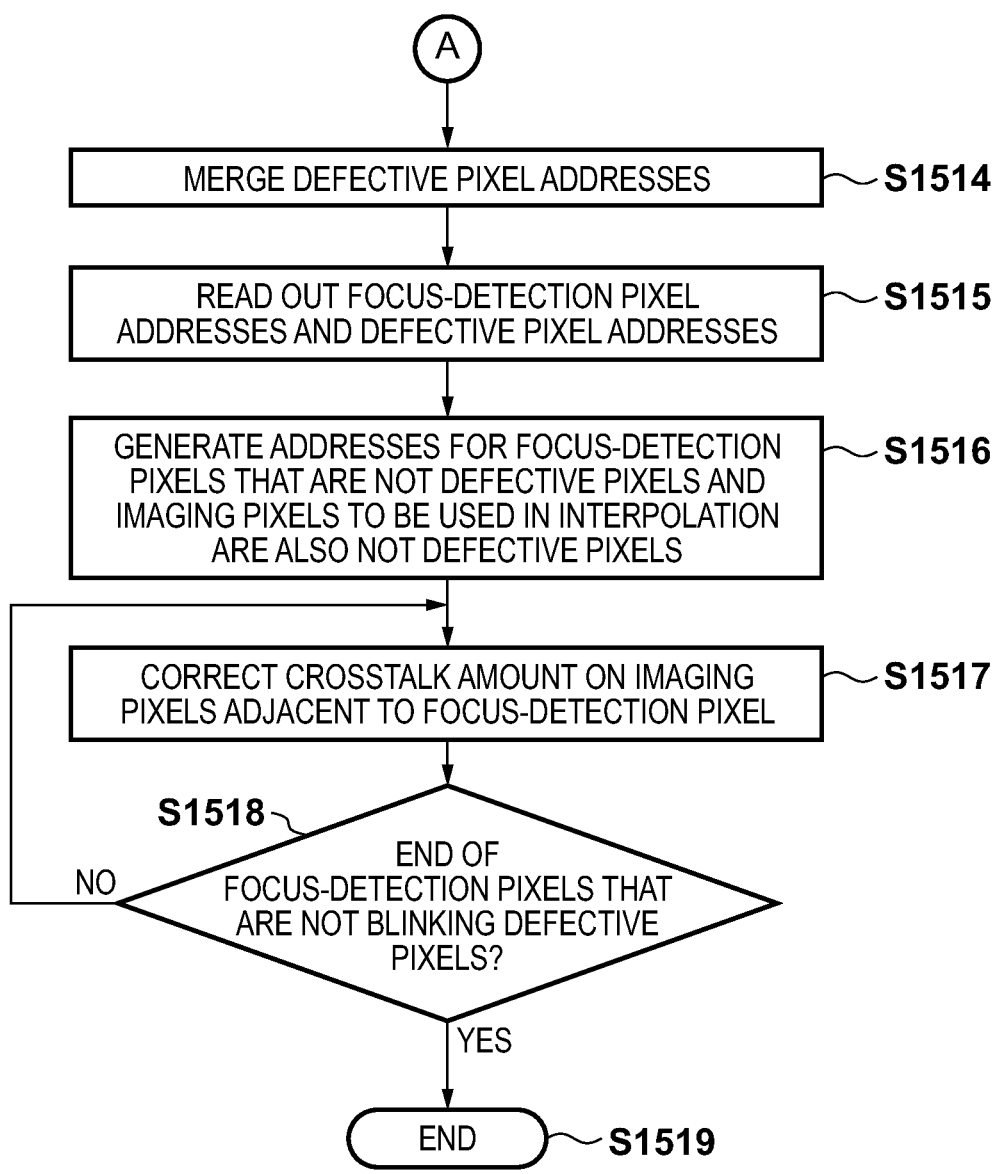

The following describes an example of processing for correcting the crosstalk amount on imaging pixels that are adjacent to a focus-detection pixel according to the present variation with reference to the flowcharts of FIGS. 15A and 15B.

This crosstalk correction processing is mainly applied by the CPU 121. In step S1502, the CPU 121 reads out defective pixel information from the defective pixel information memory 143. In step S1503, the CPU 121 determines the type of defective pixel for the pixel targeted for correction (blinking or stable defective pixel) based on the defective pixel type identification ID included in the defective pixel information.

In step S1504, the CPU 121 references the defective pixel determination table 145 that corresponds to the determined defective pixel type and photographing condition. Then, in step S1505, the CPU 121 determines whether the defect level of the pixel of interest is included among the defect levels at which a pixel is treated as a "defective pixel" under the photographing condition. The defective pixel determination tables 145 are tables for determining that a focus-detection pixel is a defective pixel (ranges of defect levels) in accordance with the photographing condition of the image targeted for correction.

In step S1506, it is determined whether the pixel of interest is a defective pixel. If it was determined in step S1506 that the pixel of interest is a defective pixel under the current photographing condition, the procedure moves to step S1507, and if it was determined that the pixel of interest is not a defective pixel, the procedure moves to step S1513. In steps S1507 to S1509, it is determined whether the pixel of interest is a focus-detection pixel or an imaging pixel to be used in interpolation of the focus-detection pixel.

In step S1507, it is determined whether the pixel of interest is a focus-detection pixel, and if the pixel of interest was determined to be a focus detection pixel, information (an address) indicating the position of the focus detection pixel is then stored in the storage portion 141 in step S1510. In steps S1508 and S1509, it is determined whether the pixel of interest is an imaging pixel to be used in interpolation of a focus-detection pixel. Here, according to Expression (2), the CPU 121 determines whether the pixel of interest is either of adjacent imaging pixels of the same color as a focus-detection pixel and on the left and right respectively of the focus-detection pixel. In case of Bayer pattern pixels of the same color are arranged every two pixels in the left and right direction and thus in the steps S1508 and S1509 it is determined whether the pixel of interest is a second pixel from the focus-detection pixel in the left or right direction.

If the pixel of interest was determined to be an imaging pixel to be used in interpolation of a focus-detection pixel, in step S1511 or S1512, the CPU 121 stores information (an address) indicating the position of the focus-detection pixel to likewise be referenced in Expression (1) in the storage portion 141. In the subsequent step S1513, the CPU 121 determines whether defective pixel determination has been applied for all of the defective pixel information, and in the case of a negative determination, the procedure moves to step S1502 in which the next piece of defective pixel information is read, and then defect determination is performed.

If it is determined in step S1513 that defective pixel determination has been applied for all of the defective pixel information, in step S1514 (FIG. 15B), the CPU 121 merges the position information (addresses) stored in the storage portion 141. In steps S1510, S1511, and S1512, there are cases where information (addresses) indicating the position of the same focus detection pixel is stored multiple times as a result of the various determinations, and if the same position information is stored multiple times, the CPU 121 merges or integrates them to a single piece of information.

Next, in step S1515, the CPU 121 reads the focus-detection pixel address information and the position information (addresses) stored in the storage portion 141 that was output in step S1514. The CPU 121 then generates address information for the focus-detection pixels that are not defective pixels (and imaging pixels to be used in interpolation of the focus-detection pixels are also not defective pixels) based on the address information that was read.

In steps S1517 to S1518, the CPU 121 performs crosstalk amount correction according to Expression (1) and Expression (2) on the imaging pixels that are adjacent to the focus-detection pixels recorded in the address information that was generated in step S1516.

This enables reducing image quality degradation in the vicinity of a focus-detection pixel even if an imaging pixel that is referenced when performing crosstalk correction is a defective pixel.

Other Embodiments

Note that although crosstalk correction processing is described in the above embodiments as an example of correction processing that employs the output of focus-detection pixels, the problems due to performing correction processing based on abnormal output of course do not only arise in the case of crosstalk correction processing. The configurations described above are also applicable to cases of performing other correction processing. The range of applicability of the present invention is therefore not intended to be limited to crosstalk correction processing.

Also, the above embodiments describe configurations in which the CPU 121 applies processing in the form of software. However, at least some of the processing may be applied by hardware (an ASIC, programmable logic, or the like).

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-277659, filed on Dec. 19, 2011, and No. 2012-263677, filed on Nov. 30, 2012, which are hereby incorporated by reference herein their entirety.

What is claimed is:

1. An image capture apparatus comprising:
an image sensor that includes a plurality of first pixel portions and a plurality of second pixel portions wherein each of the first pixel portions and the second pixel portions has a photoelectric conversion portion and an opening through which light is incident on the photoelectric conversion portion, and wherein the opening of the first pixel portion is larger than the opening of the second pixel portion; and
a CPU comprising a first signal processing unit that;
if a second pixel portion is determined as a first type defective pixel portion under a photographing condition, corrects an output signal from the second pixel portion and performs a correction processing on output signals from first pixel portions that are adjacent or neighboring to the second pixel portion, using the corrected output signal from the second pixel portion; and
if the second pixel portion is determined as a second type defective pixel portion under the photographing condition, does not perform the correction processing on output signals from the first pixel portions that are adjacent or neighboring to the second pixel portion.

2. The image capture apparatus according to claim 1, wherein the second type defective pixel is a blinking defective pixel.

3. The image capture apparatus according to claim 1, wherein the first type defective pixel is a stable defective pixel.

4. The image capture apparatus according to claim 1, wherein the photographing condition includes one of a charge accumulation time of the image sensor and a temperature of the image sensor or the vicinity thereof.

5. The image capture apparatus according to claim 1, wherein the second pixel portions are arranged regularly.

6. The image capture apparatus according to claim 1, wherein the correction processing performed by the first signal processing unit is a correction processing for reducing a difference that occurs due to a structural difference between the first pixel portions and the second pixel portions.

7. The image capture apparatus according to claim 1, further comprising aluminum wiring that shields the second pixel portions from light.

8. The image capture apparatus according to claim 1, wherein the correction processing performed by the first signal processing unit is a processing for correcting a crosstalk amount difference between the first pixel portions and the second pixel portions.

9. The image capture apparatus according to claim 1, the CPU further comprising a second signal processing unit that performs image processing on a signal on which the correction processing was applied by the first signal processing unit or a signal on which the correction processing was not applied by the first signal processing unit, and records a signal resulting from the image processing.

10. The image capture apparatus according to claim 1, wherein the first signal processing unit corrects an output signal from a first pixel portions that is adjacent or neighboring to a second pixel portion and was not subjected to the correction processing, using output signals from other first pixel portions.

11. The image capture apparatus according to claim 1, wherein output signals of a plurality of the second pixel portions are used to perform a correlation processing.

12. The image capture apparatus according to claim 1, the CPU further comprising a determination unit that determines whether or not each of the second pixel portions is a defective pixel based on its output signal, determines a defective pixel type with respect to each of second pixel portions that is determined as the defective pixel, and records information indicating determination results in a memory.

13. The image capture apparatus according to claim 12, wherein each of the second pixel portions is determined whether the first type defective pixel or the second type defective pixel based on the photographic condition the information recorded in the memory.

14. The image capture apparatus according to claim 13, wherein the determination unit further determines a defect level with respect to each of the second pixel portions that was determined as a defective pixel, and wherein the second pixel portions having the defective level within a range based on the photographic condition are determined as the first type defective pixel or the second type defective pixel included in is determined as whether or not.

15. The image capture apparatus according to claim 14,
wherein different ranges of the defect levels are used for determining the first type defective pixels and the second type defective pixel, and
wherein the range of the defect levels used for determining the first type defective pixel portion is more sensitive in a charge accumulation time of the image sensor than that used for determining the second type defective pixel portion.

16. The image capture apparatus according to claim 14,
wherein different ranges of the defect levels are used for determining the first type defective pixels and the second type defective pixel, and
wherein the range of the defect levels used for determining the first type defective pixel portion is more sensitive in a temperature of the image sensor or the vicinity thereof than that used for determining the second type defective pixel portion.

* * * * *